(12) United States Patent
Percy et al.

(10) Patent No.: US 7,176,834 B2
(45) Date of Patent: *Feb. 13, 2007

(54) SATELLITE POSITIONING SYSTEM ENABLED MEDIA MEASUREMENT SYSTEM AND METHOD

(75) Inventors: Roger D. Percy, Seattle, WA (US); Kay S. Burke, Seattle, WA (US); James W. Baker, Seattle, WA (US); R. Cameron Percy, Seattle, WA (US)

(73) Assignee: RDP Asociates, Incorporated, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/366,349

(22) Filed: Mar. 2, 2006

(65) Prior Publication Data

US 2006/0145916 A1    Jul. 6, 2006

Related U.S. Application Data

(63) Continuation of application No. 10/318,422, filed on Dec. 11, 2002, now Pat. No. 7,038,619.

(60) Provisional application No. 60/345,908, filed on Dec. 31, 2001, provisional application No. 60/427,904, filed on Nov. 20, 2002.

(51) Int. Cl.
*G01S 5/14* (2006.01)
*H04H 9/00* (2006.01)
*G06F 17/30* (2006.01)
*G07G 1/00* (2006.01)

(52) U.S. Cl. ............................... 342/357.07; 455/2.01; 705/10

(58) Field of Classification Search ................. None
See application file for complete search history.

(56) References Cited

U.S. PATENT DOCUMENTS 4,623,230 A    11/1986   Weinblatt (Continued)

FOREIGN PATENT DOCUMENTS

AU    199731160 B2    12/1997

(Continued)

OTHER PUBLICATIONS

Bloom, D., "Measuring Panel Position & Viability," *Outdoor Advertising Research—International Conference*, Zurich, Nov. 23, 2001, <http://www.imu.unibe.ch/forschung/advertising.html> [retrieved Nov. 12, 2002].

(Continued)

*Primary Examiner*—Gregory C. Issing
(74) *Attorney, Agent, or Firm*—Christensen O'Connor Johnson Kindness PLLC

(57) ABSTRACT

The present invention is directed to utilizing monitoring devices (200) for determining the effectiveness of various locations, such as media display locations (150) for an intended purpose (media display exposure). The monitoring devices (200) are distributed to a number of study respondents. The monitoring devices (200) track the movements of the respondents. While various technologies may be used to track the movements of the respondents, at least some of the location tracking of the monitoring device (200) utilize a satellite (105) location system such as the global positioning system ("GPS"). These movements of the respondent and monitoring device (200) at some point coincide with exposure to a number of media displays (150). Geo data (movement data) collected by the monitoring devices, is downloaded to a download server (300), for determining which media displays (150) the respondent was exposed to. The exposure determinations are made by a post-processing server (400).

30 Claims, 22 Drawing Sheets

U.S. PATENT DOCUMENTS

| | | | |
|---|---|---|---|
| 4,930,011 | A | 5/1990 | Kiewit |
| 5,394,333 | A | 2/1995 | Kao |
| 5,406,271 | A | 4/1995 | Sonnendorfer et al. |
| 5,410,724 | A | 4/1995 | Worthy |
| 5,576,716 | A * | 11/1996 | Sadler .................. 342/357.07 |
| 5,629,708 | A | 5/1997 | Rodal et al. |
| 5,638,077 | A | 6/1997 | Martin |
| 5,771,307 | A | 6/1998 | Lu et al. |
| 5,812,959 | A | 9/1998 | Froeburg et al. |
| 5,815,114 | A | 9/1998 | Speasl et al. |
| 5,825,283 | A | 10/1998 | Camhi |
| 5,890,068 | A | 3/1999 | Fattouche et al. |
| 5,898,384 | A | 4/1999 | Alt et al. |
| 5,901,171 | A | 5/1999 | Kohli et al. |
| 5,952,958 | A | 9/1999 | Speasl et al. |
| 5,995,015 | A | 11/1999 | DeTemple et al. |
| 6,041,280 | A | 3/2000 | Kohli et al. |
| 6,091,956 | A | 7/2000 | Hollenberg |
| 6,098,048 | A | 8/2000 | Dashefsky et al. |
| 6,125,325 | A | 9/2000 | Kohli |
| 6,236,937 | B1 | 5/2001 | Kohli |
| 6,246,948 | B1 | 6/2001 | Thakker |
| 6,252,522 | B1 | 6/2001 | Hampton et al. |
| 6,266,442 | B1 | 7/2001 | Laumeyer et al. |
| 6,301,533 | B1 * | 10/2001 | Markow .................. 701/35 |
| 6,393,046 | B1 | 5/2002 | Kohli et al. |
| 6,397,041 | B1 | 5/2002 | Ballard et al. |
| 6,400,753 | B1 | 6/2002 | Kohli et al. |
| 6,421,609 | B2 | 7/2002 | Kohli |
| 6,507,802 | B1 | 1/2003 | Payton et al. |
| 6,531,982 | B1 | 3/2003 | White et al. |
| 6,571,279 | B1 | 5/2003 | Herz et al. |
| 6,574,558 | B2 | 6/2003 | Kohli |
| 6,580,916 | B1 | 6/2003 | Weisshaar et al. |
| 6,615,130 | B2 | 9/2003 | Myr |
| 7,038,619 | B2 * | 5/2006 | Percy et al. .......... 342/357.07 |
| 2001/0037232 | A1 | 11/2001 | Miller |
| 2002/0022488 | A1 | 2/2002 | Srinivasan et al. |
| 2002/0097193 | A1 | 7/2002 | Powers |
| 2002/0111847 | A1 * | 8/2002 | Smith, II .................. 705/10 |
| 2004/0127192 | A1 | 7/2004 | Ceresoli et al. |

FOREIGN PATENT DOCUMENTS

| | | |
|---|---|---|
| CN | 2252903 A1 | 4/1997 |
| EP | 1 209 483 A2 | 5/2002 |
| EP | 0 895 599 B1 | 8/2002 |
| EP | 0 731 339 B1 | 11/2002 |
| EP | 1 271 102 A2 | 1/2003 |
| WO | WO 01/11506 A1 | 2/2001 |
| WO | WO 02/15806 A1 | 2/2002 |

OTHER PUBLICATIONS

Bourli, Y., "Definition of Gobards™ Brand Billboard 4×3 m," *Outdoor Advertising Research—International Conference*, Zurich, Nov. 23, 2001, <http://www.imu.unibe.ch/forschung/advertising.html> [retrieved Nov. 12, 2002].

Christensen, F.G., "The Danish GPS Outdoor Measurement Project," *Outdoor Advertising Research—International Conference*, Zurich, Nov. 23, 2001, <http://www.imu.unibe.ch/forschung/advertising.html> [retrieved Nov. 12, 2002].

de Foucault, D., "Outdoor Advertising Audience: Towards a National and Regular Measurement," *Outdoor Advertising Research—International Conference*, Zurich, Nov. 23, 2001, <http://www.imu.unibe.ch/forschung/advertising.html> [retrieved Nov. 12, 2002].

Del Barrio Diaz, A., "Geomex Basic Processes," *Outdoor Advertising Research—International Conference*, Zurich, Nov. 23, 2001, <http://www.imu.unibe,ch/forschung/advertising.html> [retrieved Nov. 12, 2002].

Drabczynski, M., "Outdoor Advertising Research," *Outdoor Advertising Research—International Conference*, Zurich, Nov. 23, 2001, <http://www.imu.unibe.ch/forschung/advertising.html> [retrieved Nov. 12, 2002].

Dyer, R.F., et al., *Case Studies in Marketing Decisions Using Expert Choice*, Decision Support Software, McLean, Virginia, 1988, pp. 8-15.

Eddleston, N., "Outdoor Advertising Research: The Media Owner Perspective," *Outdoor Advertising Research—International Conference*, Zurich, Nov. 23, 2001, <http://www.imu.unibe.ch/forschung/advertising.html> [retrieved Nov. 12, 2002].

Leuthi, P., et al., "Low Cost Inertial Navigation System," Apr.-Jul. 2000, <http://www.electronic-engineering.ch/study/ins/ins.html>.

Mezzalsalma, A., "Audience Research Using Portable GPS Units: The Italian Experience," *Outdoor Advertising Research—International Conference*, Zurich, Nov. 23, 2001, <http://www.imu.unibe.ch/forschung/advertising.html> [retrieved Nov. 12, 2002].

Pasquier, M., "Methodological Aspects of Research in Outdoor Advertising," *Outdoor Advertising Research—International Conference*, Zurich, Nov. 23, 2001, <http://www.imu.unibe.ch/forschung/advertising.html> [retrieved Nov. 12, 2002].

Schwarz, R., "GfK Outdoor Advertising Research—G-Score," *Outdoor Advertising Research—International Conference*, Zurich, Nov. 23, 2001, <http://www.imu.unibe.ch/forschung/advertising.html> [retrieved Nov. 12, 2002].

Stewart, M., "ADAM Advertising Display Audience Metering," *Outdoor Advertising Research—International Conference*, Zurich, Nov. 23, 2001, <http://www.imu.unibe.ch/forschung/advertising.html> [retrieved Nov. 12, 2002].

Thurner, R., "Outdoor Advertising Research The Media Owner Perspective," *Outdoor Advertising Research—International Conference*, Zurich, Nov. 23, 2001, <http://www.imu.unibe.ch/forschung/advertising.html> [retrieved Nov. 12, 2002].

van Muers, L., "Outdoor Advertising Research in the Netherlands: The SUMMO-Model," *Outdoor Advertising Research—International Conference*, Zurich, Nov. 23, 2001, <http://www.imu.unibe.ch/forschung/advertising.html> [retrieved Nov. 12, 2002].

* cited by examiner

SATELLITE POSITIONING SYSTEM ENABLED MEDIA MEASUREMENT SYSTEM AND METHOD

CROSS-REFERENCES TO RELATED APPLICATIONS

This application is a continuation of U.S. patent application Ser. No. 10/318,422, filed Dec. 11, 2002, which claims the benefit of U.S. Provisional Patent Application No. 60/345,908, filed Dec. 31, 2001, and U.S. Provisional Patent Application No. 60/427,904, filed Nov. 20, 2002, each of which applications is expressly incorporated herein by reference.

FIELD OF THE INVENTION

The present invention generally relates to assessing the effectiveness of media displays. More specifically, the present invention is directed toward tracking individuals and their exposures to media displays using a satellite positioning system enabled device and other methods.

BACKGROUND

The media industries (print, television, radio, on-line, outdoor, and indoor) are always interested in determining their audiences so as to better assess the value of the products they provide to advertisers and others. Given recent developments in the media industries, there has been a renewed interest in outdoor and indoor media displays. Unfortunately, until now there has been a lack of consensus and acceptance of a system and/or method of assessing the value of outdoor and indoor media displays (e.g., billboards, posters, kiosks, video kiosks, on-line kiosks, and other publicly viewable media displays). More specifically, in recent years, the publicly viewable media display industries have made significant progress in delivering their publicly viewable media displays. Unfortunately, the research industry that could provide exposure, frequency, and reach estimates has not kept pace with these developments. Accordingly, publicly viewable media display providers have not been able to take advantage of media-buying changes and thereby increase market share against other measured media (e.g., television, radio, and on-line). In fact, many potential clients do not even consider publicly displayed media as there is no reliable measurement system to gauge exposure to the public.

Accordingly, it would be an advantage to provide accurate measurements of exposure to public media displays in order to obtain exposure, reach and frequency statistics that can justify the value of such media displays. However, there are unique problems with media displays. Radio, TV, and on-line media have the ability to assure a one-to-one or at least a one-to-a limited number tracking of viewers. The very nature of publicly viewable media displays allows a variety of individuals to be viewing the same display at the same time. Furthermore, there may be many more "channels" of publicly viewable media displays available in a given geographic area than would be available over radio or television.

This increase in both viewers and publicly viewable media channels provides scalability issues. If every individual and every media display must be tracked, the cost of calculating accurate reach and frequency statistics may become prohibitive. Previous media display solutions have tried to provide such an unscalable many-to-many solution.

One such previous system has tried to provide radios in vehicles that respond to radios on media displays. However to be effective, such a system requires radios on every media display in a given environment to give an accurate assessment. Leaving a radio off a particular media display would mean that media display has no chance of being assessed. Additionally, a substantial subset of individuals must carry radios responsive to the media display radios in order for this approach to be even marginally effective.

Another ineffective solution has been the use of consumer surveys. Consumer surveys are ineffective because such surveys change respondent behavior and are inherently inaccurate as respondents rarely remember all the media displays they were exposed to. As many media providers are well aware, some media displays can convey a message, and change a respondent's behavior, without the respondent actively recalling that they were exposed to the media display.

Other previous systems have involved tracking vehicles through various means. While vehicle tracking is marginally effective, it has the drawback of being less granular with regard to demographics. Over an extended period of time many vehicles will have different occupants having different demographics. It is difficult, if not impossible, to accurately reconstruct the demographics of every passenger and/or driver of a vehicle. Additionally, under ordinary circumstances, vehicles are not allowed in pedestrian-only areas, such as shopping malls and/or pedestrian thoroughfares.

Similar needs are found in other industries that are also interested in determining their audiences so as to better plan for placement of services and other assets. Until now there has been a similar lack of consensus and acceptance of a system and/or method of assessing the value of placement of services and other assets.

Accordingly, there is a need for an accurate system and/or method for tracking the exposure of demographically identified individuals to media displays. Such tracking should be operable over extended periods and should track individuals both indoors and outdoors. It is desirable that such a system and or method also be usable in other industries.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to utilizing monitoring devices for determining the effectiveness of various locations for an intended purpose. In one embodiment, the monitoring devices are used for determining the effectiveness of media displays. In this exemplary embodiment, the monitoring devices are distributed to a number of study respondents for carrying on the person of the respondents, whose demographics are known. The monitoring devices track the movements of the respondents. While various technologies may be used to track the movements of the monitoring devices and, thus, the respondents, preferably the monitoring device location tracking utilizes a satellite position system ("SPS") such as the global positioning system ("GPS") or differential global positioning system ("DGPS"). More specifically, those of ordinary skill in the art and others will appreciate from the following description that the present invention may utilize a variety of satellite and radio frequency location tracking systems (e.g., GPS, Galileo, DGPS, GLOSNASS, WAAS, OMEGA, LORAN, VOR, etc.). Collectively, such systems will be referred to as positioning systems, for ease of description. Regardless of the nature of the location tracking system, the movements of the respondent and monitoring device at some point coincide with the location of a number of media displays. Collecting geo data (movement data) from the monitoring devices and knowing the location of media displays makes it possible to determine which media displays respondents were exposed to. This information allows the effectiveness of the media displays to be rated based on reach and frequency. Reach is a measure of how many respondents were exposed to a media display, and frequency is a measure of the number of exposures (on average) per respondent.

If desired, the monitoring devices may be initialized with study specific data (e.g., geographic regions of a study, length of time of a study, device behavior profiles, specific indoor zones to be tracked, etc.). In addition to utilizing SPS tracking, which requires access to SPS signals in order to determine a location, some exemplary monitoring devices may also utilize radio frequency identification ("RFID") signals as an additional aid in determining a respondent's location. Other possible location determining components may be used in these monitoring devices. Accelerometers, gyroscopes, inclinometers, barometers and compasses may in some embodiments augment the location and movement tracking capabilities of the monitoring devices.

In accordance with further aspects of the present invention, the data gathered from the respondents may further be categorized by demographics to allow for more detailed understanding of the effectiveness of media displays.

In accordance with still other aspects of the present invention, the monitoring devices may be distributed to respondents in any one of a variety of different manners, such as by mailing the monitoring devices to the respondents or in some way using a common carrier and/or courier to have them delivered to the respondents.

In accordance with additional aspects of the present invention, preferably, the effectiveness of media displays is determined using a post-processing server after geo data has been obtained from a plurality of data sources, i.e., monitoring devices. The geo data represents locations along the path of travel of at least one respondent. The locations are matched to the locations of media displays. The effectiveness of such media displays is determined based on the number of matches between geo data locations and media display locations. If desired, prior to such a determination, the geo data is analyzed and any erroneous data (e.g., out-of-tabulation data) is removed. The effectiveness of the media displays is then rated by determining the reach and frequency of the media displays.

In accordance with still additional aspects of the present invention, preferably, geo data is enhanced with other data to enhance accuracy. Both complete and incomplete geo data can be enhanced with other data. One source of other data is a geographic information system ("GIS") database. Geo data accuracy can be enhanced by GIS data by locating a respondent on an adjacent street when the geo data places the respondent near, but not on, the street, for example. Additionally, the geo data may be "groomed" by conventional location data grooming methods to further enhance accuracy.

In accordance with other aspects of the present invention, preferably, the post-processing server determines media display effectiveness by obtaining geo data specifying the locations traversed by a monitoring device and matching the monitoring device locations with a number of media display locations (e.g., by determining whether the monitoring device traversed within a threshold distance of a media display location). Matches between monitoring device locations and the media display locations establish that the respondent carrying the monitoring device was exposed to the media displays. The geo data may be obtained directly from the monitoring devices or in the alternative may be obtained from intermediary devices such as download servers that obtain the geo data from the monitoring devices. In addition to retrieving geo data describing the locations and movements of a respondent, in an exemplary embodiment of the present invention, device data is also gathered. The device data may be gathered directly from the monitoring devices themselves or, as noted above, through intermediary devices such as download servers. Device data may comprise monitoring devices diagnostic data, monitoring device status information, etc.

In accordance with yet other aspects of the present invention, preferably, the geo data is periodically stored ("geo data points"). For comparison purposes, lines between these geo data points are calculated. In one embodiment of the present invention, straight lines are calculated. Alternatively, curved lines based on the progression of geo data points are calculated. Additionally, the geo data points may be used to calculate movement speed, i.e., velocity.

Still further, in accordance with another aspect of the present invention, the geo data may be groomed to increase its accuracy. Potential grooming methods include adding DGPS data to the geo data, merging partial geo data locations with known data, and/or ascribing additional geo data locations from known data.

In accordance with further aspects of the present invention, preferably, geo data is analyzed to locate anomalous data (e.g., data in incorrect form and/or data describing a highly unlikely location, etc.). Anomalous geo data may be stored for subsequent processing. Subsequent processing of anomalous and non-anomalous geo data is used to determine confidence ratings for monitoring device locations, i.e., geo data points.

In addition to determining exposures, reach, and frequency of media displays in yet further embodiments of the present invention, the reach and frequency ratings are categorized in accordance with the demographics of respondents. Also, processing the geo data may be processed to determine gross rating points ("GRPs") and daily effective circulation ratings for each media display.

In still further embodiments of the present invention, a survey of respondent's recall of media displays is obtained and processed. Processing is such that a respondent's recall is collated to respondent's geo data. In addition to recall, if desired, a survey of a respondent's purchasing behavior may be obtained and processed. Again, processing is such that a respondent's purchases are collated in some manner with the respondent's geo data. Processed recall and purchasing surveys are useful in rating the effectiveness of media displays.

In accordance with alternative aspects of the present invention, information other than media display effectiveness for existing media displays is determined. For example, the potential effectiveness of a location that could have a media display is determined. In accordance with the invention, such a determination can be made by post processing geo data specifying a plurality of locations traversed by a monitoring device in a geographic region in accordance with a target level of media display exposure and a budget. All potential locations that fall within the budget are then matched to the geo data locations to determine for each of the potential locations whether the monitoring device would have been exposed to a potential media display at each of the potential locations. The result determines which locations would have had the most exposure. In additional embodiments, reach, frequency, GRPs, and daily effective circulation may be factored in when determining the optimal placement for a media display.

In accordance with other alternative aspects of the present invention, the geo data is used for location usage planning without regard to media displays. First, geo data specifying locations that have been traversed by monitoring devices within a geographic region are determined. Next, desired traffic (e.g., movement) characteristics for a desired location are selected. The geo data locations are then examined to determine their traffic characteristics. The established traffic characteristics of the geo data locations and the desired traffic characteristics are compared to determine whether any of the geo data locations conform to the desired traffic characteristics. The geo data may in some embodiments include the locations along lines between geo data points. Such an embodiment allows for the planning of retail locations, services, and the like.

In accordance with still other aspects of the present invention, preferably, the monitoring devices operate periodically to obtain SPS data by determining which satellites are available, identifying at least some of the available satellites and storing data of at least some of the satellites along with a date and time. When SPS data is unavailable, preferably monitoring devices formed in accordance with this invention reduce power usage.

In accordance with yet still other aspects of this invention, in addition to including SPS location determination components, alternative monitoring devices formed in accordance with this invention include other types of location determining components such as RF locating components (e.g., transponders, receivers, transmitters, RFID devices, etc.).

Alternate embodiments of monitoring devices formed in accordance with this invention decrease power usage when a motion sensing component indicates that a threshold time has passed with no movement of the monitoring device. Preferably, such monitoring devices stop trying to acquire SPS and/or other location information as there is no need to continually acquire this information by immobile monitoring devices. One suitable motion sensing component is a trembler device.

Still other alternate embodiments of monitoring devices formed in accordance with this invention determine a projected life of the monitoring device's power source and change the period of acquisition of SPS and/or other location data based on a projected life of the power source. Such embodiments allow a device whose battery power is almost exhausted to continue acquiring useful information over a period of time (such as a study period) during which data is desired.

Yet still other embodiments of monitoring devices formed in accordance with the present invention include additional location determining components such as a radio frequency ("RF") location determining component. Suitable RF location determining components are RF transponders, transmitters, and/or receivers that can be used to either gather additional location information, or in the case of a transmitter to provide identification information to a receiver at a known location. Of course, additional non-RF location determining components also may be included in such embodiments.

As will be readily appreciated from the foregoing summary, the invention provides a new and improved method, systems, and computer readable medium for providing enriched location based information and using the information to determine the effectiveness of media displays, potential media display locations, etc.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

The detailed description which follows is in terms of processes and symbolic representations of operations by conventional computing components, including processors, memory storage devices for the processor, connected input and output devices. These described processes and operations may utilize conventional computing components as well as more specialized components in a heterogeneous distributed computing environment, including remote file servers, computer servers, and memory storage devices. Each of these conventional distributed computing components may be accessible by a processor via a communication network.

Figure 1:
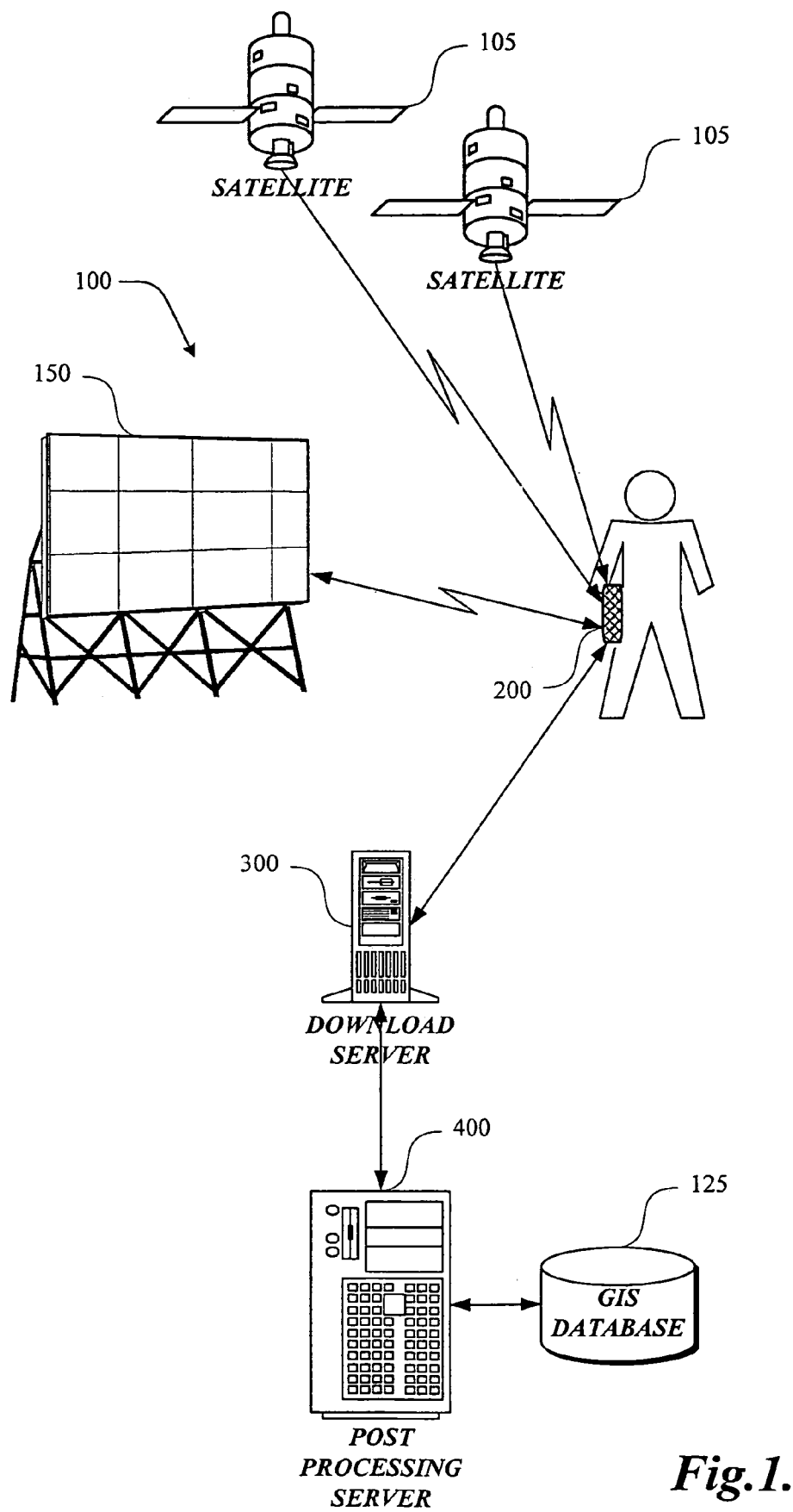
FIG. 1 is a block diagram of a system for monitoring publicly viewable media displays formed in accordance with the present invention.
Figure 2:
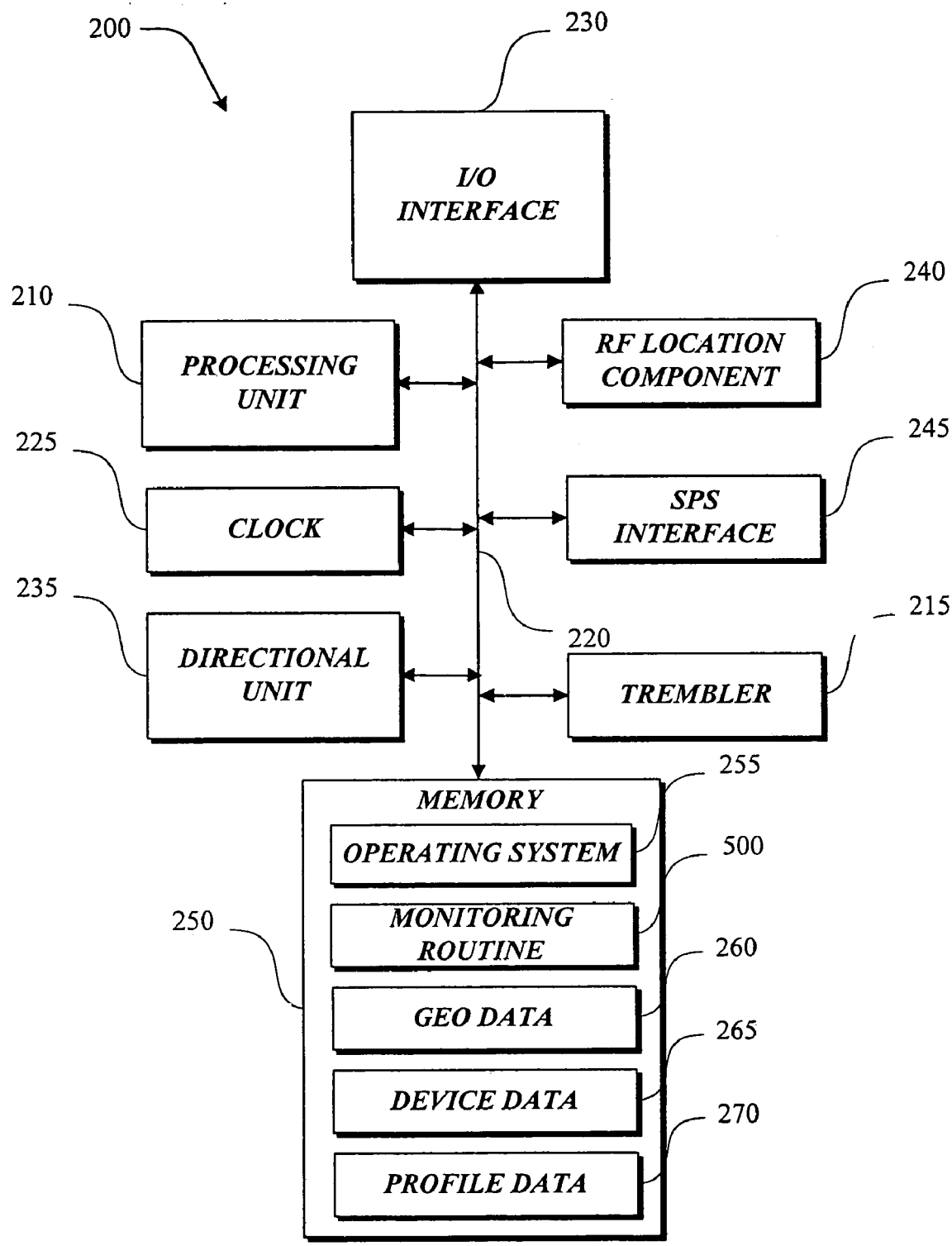
FIG. 2 is a block diagram of a monitoring device for tracking a respondent's movements formed in accordance with the present invention.
Figure 3:
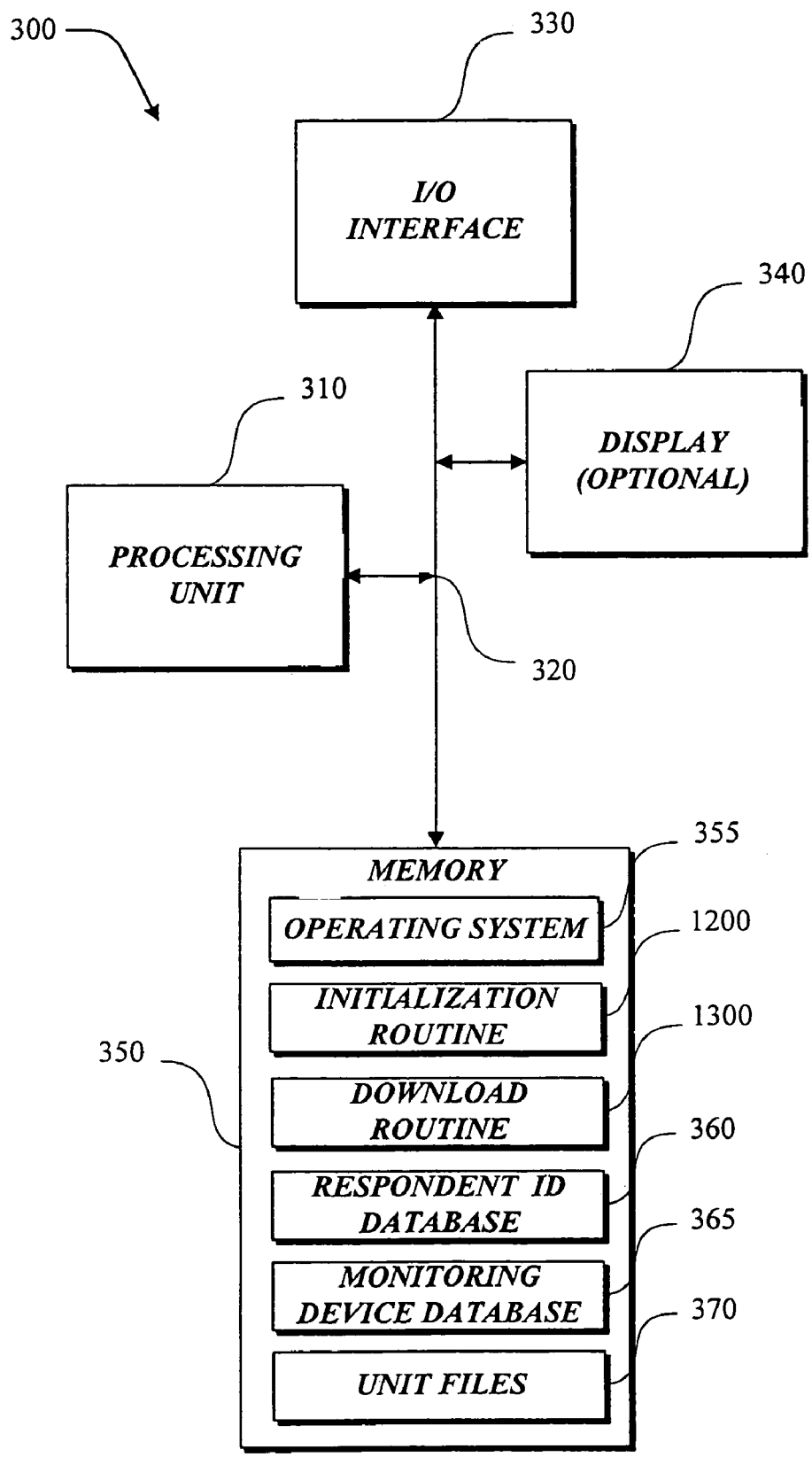
FIG. 3 is a block diagram of a download server for receiving data from a monitoring device formed in accordance with the present invention.
Figure 4:
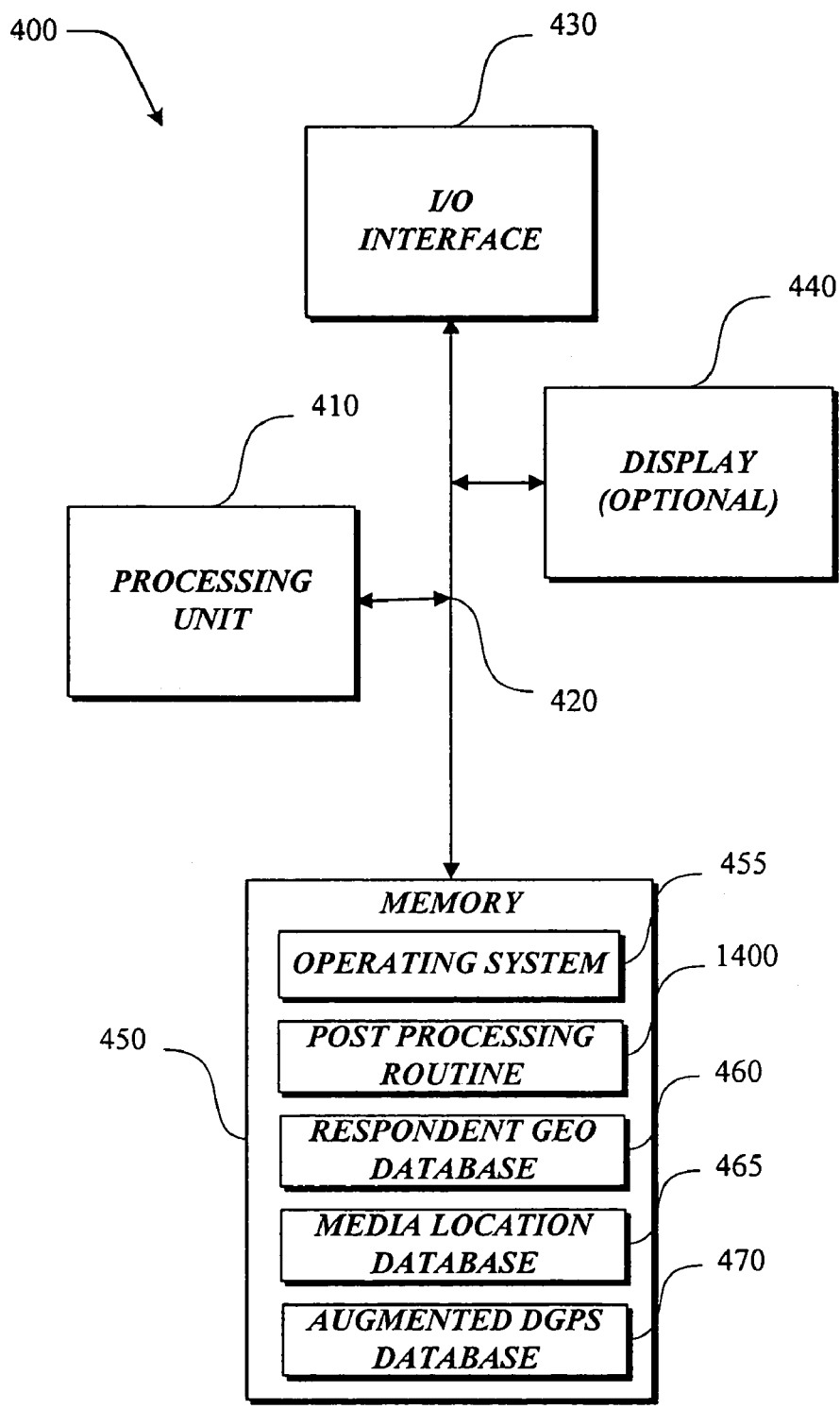
FIG. 4 is a block diagram of a post processing server for processing information received from download servers formed in accordance with the present invention.

FIG. 1 is a functional block diagram of a system 100 for determining the reach and frequency of a respondent's exposure to publicly viewable media displays. While the system 100 generally operates in a computing environment comprising individual computer systems, some of which may be interconnected over a network (such as the Internet, publicly switched telephone network, or others), it will be appreciated by those of ordinary skill in the art and others that the system 100 could equally function with a single standalone computer system. The system 100 shown in FIG. 1 includes a monitoring device 200, satellite positioning system ("SPS") satellites 105, a media display 150, a download server 300, a post processing server 400, and a geographic information system ("GIS") database 125. It will be appreciated by those of ordinary skill in the art and others that a conventional GIS database 125 may reside in the post processing server 400 or may reside on a separate device. The monitoring device 200, download server 300, and post processing server 400 are further described below in relation to FIGS. 2, 3 and 4, respectively. Additionally, while for ease of illustration only one monitoring device 200, one download server 300, one post processing server 400, and one media display 150 have been shown, it will be appreciated that many such devices and/or displays may be included in the system 100 or that the download server 300 and the post-processing server 400 may reside on the same device. FIGS. 2, 3, and 4 illustrate exemplary devices suitable for determining the exposure to and reach and frequency of media displays. The devices are only examples and are not intended to suggest any limitation as to the scope of use or functionality of the invention. Neither should the devices be interpreted as having any dependency requirement relating to any one or a combination of components illustrated in the examples.

To better illustrate the interaction of, and purposes for, the devices of FIG. 1, the following exemplary embodiment is presented. In this exemplary embodiment, using the devices of system 100, the effectiveness of the multiple media displays 150 is rated using multiple monitoring devices 200, the download server 300, and the post processing server 400. The monitoring devices 200 are distributed to a number of study respondents. Each respondent carries the monitoring devices, which, in turn, track the movements of the associated respondent. The movement of the respondents carrying the monitoring devices at some point result in the respondents being exposed to media displays 150, i.e., the respondents reach positions in their movements where they can visually or audibly receive the information provided by the media displays. As the respondents move, the monitoring devices store the tracking data determined by the monitoring devices ("geo data"). The geo data collected by the monitoring devices is used to determine which media displays the respondent was exposed to by comparing the geo data with location data defining the location of the media display. More specifically, the monitoring devices 200, in the embodiment of the invention illustrated in FIG. 1, download their geo data to one or more download servers 300. The download servers 300 forward the downloaded geo data to the post-processing server 400. The post processing server 400 processes the geo data using data from the GIS database as necessary and compares the processed geo data with data defining the location of the media displays 150 to determine the exposure of the respondents carrying the monitoring devices to the media displays. The effectiveness of the media displays is then rated by the post-processing server 400 determining the reach and frequency of the media displays. Reach is a measure of how many respondents were exposed to the media displays, and frequency is a measure of the number of exposures (on average) per respondent.

The invention is operable in numerous general purpose or special computing device environments or configurations other than the exemplary one shown in FIG. 1. Examples of well known computing devices, environments, and/or configurations that may be suitable for implementing the invention include, but are not limited to, personal computers, server computers, laptop devices, multiprocessor systems, microprocessor-based systems, network PCs, minicomputers, mainframe computers, and handheld computers operable as stand alone devices and in distributed computing environments.

FIG. 2 depicts several key components of an exemplary monitoring device 200. Those of ordinary skill in the art and others will appreciate that the illustrated monitoring device 200 may include more or less components than those shown in FIG. 2. However, it is not necessary that all of these generally conventional components be shown in order to disclose a monitoring device suitable for practicing the present invention. It will also be appreciated by those of ordinary skill in the art and others that a monitoring device 200 suitable for practicing the invention may have many form factors, e.g., as a small device carried by an individual, a vehicle mounted device, an added component of another device, etc. As shown in FIG. 2, the monitoring device 200 includes an input/output ("I/O") interface 230 for connecting to other devices (such as the download server 300). Those of ordinary skill in the art and others will appreciate that the I/O interface 230 includes the necessary circuitry for such a connection, and is also constructed for use with the protocols required by a particular implementation of the invention.

The illustrated monitoring device 200 also includes a processing unit 210, a clock 225, an RF location component 240, a SPS interface 245, a trembler 215, a directional unit 235, and a memory 250 all interconnected along with the I/O interface 230 via a bus 220. The clock 225 provides time information to the monitoring device 200. The RF location component 240 is an optional component that is responsive to radio signals. The RF location component may include a receiver for receiving location information from another RF device or a transmitter that broadcasts the location of the monitoring device. Alternatively, the transmitter could transmit a monitoring device identification code for receipt by RF receivers located proximate to the media display 150. Still further, exemplary RF location components 240 include active or passive radio frequency identification ("RFID") components and RF transponders as well as receivers and transmitters.

The SPS interface 245 is a component that is operative to receive and record SPS signals. More specifically, the SPS interface includes a SPS engine well known in the art that receives signals from SPS satellites, pseudolites or related devices and uses the signals to determine the location of the SPS engine and, thus, the device incorporating the SPS engine. SPS is a generic reference to any satellite/pseudolite based location determining system.

The trembler 215 is an optional motion sensing component that detects whether the device with which the trembler is associated, in this case a monitoring device, has been handled, jostled, or in some other manner moved. Tremblers 215 are useful for determining when a device has not moved for extended periods of time so that power saving measures can be enabled.

The directional unit 235 is an optional non-RF directional component that does not require outside broadcasts or signals to determine either position or movement in a direction. Some exemplary directional units include compasses, accelerometers, gyroscopes, barometers, altimeters, inclinometers, and the like.

The memory 250 generally comprises at least one of a random access memory ("RAM"), a read-only memory ("ROM") and a permanent storage device, such as a flash memory (e.g., flash RAM), other non-volatile solid-state memory (i.e., EEPROMs, FPGAs, etc.), disk drive, tape drive, optical drive, floppy disk drive, or some combination thereof. The memory 250 stores an operating system 255, a monitoring routine 500, geographic location data ("geo data") 260, device data 265, and a store of profile data 270. Profile data 270 may include respondent demographic information, device operation requirements (location sampling speed, power expectancy, distance to indicate movement of device, etc.) and RFID zone locations (regions where RFID communications will be turned on to augment SPS data). It will be appreciated that these software components, particularly those that change from time to time, such as respondent demographic information, RFID zone information, etc., may be loaded from another device, such as a personal computer (not shown) or the download server 300 into the memory 250 of the monitoring device 200 via the I/O interface 230.

Although an exemplary monitoring device 200 has been described that generally conforms to a conventional general purpose computing device, those of ordinary skill in the art and others will appreciate that the monitoring device 200 may take on a variety of other forms. Additionally, while some embodiments or the present invention provide for a monitoring device 200 that is operative in an outdoor environment, it will be appreciated by those of ordinary skill in the art and others that the monitoring device 200 is capable of operation a number of environments, including environments heretofore inhospitable to SPS monitoring. Thus, the invention should not be construed as limited to the form shown in FIG. 2 with or without the optional components or to the environments described above.

FIG. 3 depicts several key components of an exemplary download server 300. Those of ordinary skill in the art and others will appreciate that the download server 300 may include many more components than those shown in FIG. 3. For ease of illustration, many conventional components likely to be included in an actual download server 300, such as a keyboard, on-off switch, etc. are not illustrated. It is not necessary that all of these generally conventional components be shown in order to disclose an enabling embodiment for practicing the present invention. The exemplary download server 300 shown in FIG. 3 includes an I/O interface 330 for connecting to other devices (such as a monitoring device 200 or post processing server 400). Those of ordinary skill in the art and others will appreciate that the I/O interface 330 includes the necessary circuitry for such a connection, and is also constructed for use with the necessary protocols required by a specific embodiment of the invention.

The download server 300 also includes a processing unit 310, an optional display 340 and a memory 350 all interconnected along with the I/O interface 330 via a bus 320. The memory 350 generally comprises RAM, ROM and a permanent mass storage device, such as a disk drive, tape drive, optical drive, floppy disk drive, flash RAM, other non-volatile solid-state memory, or combination thereof. The memory 350 stores an operating system 355, an initialization routine 1200, a download routine 1300, a respondent ID database 360, a monitoring device database 365, and monitoring device ("unit") files 370. It will be appreciated that these software components may be loaded from a computer-readable medium into memory 350 of the download server 300 using a drive mechanism (not shown) associated with the computer-readable medium, such as a floppy, tape, or DVD/CD-ROM drive or via the I/O interface 330.

Although an exemplary download server 300 has been described that generally conforms to a conventional general purpose computing device, those of ordinary skill in the art and others will appreciate that the download server may take a variety of other forms, including, but not limited to, database servers configured for information processing. Thus, the download server should not be construed as limited to the form shown in FIG. 3

FIG. 4 depicts several key components of an exemplary post processing server 400. Those of ordinary skill in the art and others will appreciate that the post processing server 400 may include many more components than those shown in FIG. 4. For ease of illustration, many conventional components likely to be included in an actual processing server 400, such as a keyboard, on-off switch, etc. are not illustrated. It is not necessary that all of these generally conventional components be shown in order to disclose an enabling embodiment for practicing the present invention. The exemplary post processing server 400 shown in FIG. 4 includes an I/O interface 430 for connecting to other devices (such as a download server). Those of ordinary skill in the art and others will appreciate that the I/O interface 430 includes the necessary circuitry for such a connection, and is also constructed for use with the necessary protocols required by a specific embodiment of the invention.

The post processing server 400 also includes a processing unit 410, an optional display 440 and a memory 450 all interconnected along with the I/O interface 430 via a bus 420. The memory 450 generally comprises a RAM, a ROM, and a permanent mass storage device, such as a disk drive, tape drive, optical drive, floppy disk drive, flash RAM, other non-volatile solid-state memory, or combination thereof. The memory 450 stores an operating system 455, a post processing routine 1400, a respondent geo database 460, a media location database 465, and an augmented DGPS database 470. It will be appreciated that these software components may be loaded from a computer-readable medium into memory 450 of the post processing server 400 using a drive mechanism (not shown) associated with the computer-readable medium, such as a floppy, tape or DVD/CD-ROM drive or via the I/O interface 430.

Although an exemplary post processing server 400 has been described that generally conforms to a conventional general purpose computing device, those of ordinary skill in the art and others will appreciate that a post processing server 400 may take on a variety of other forms, including, but not limited to, database servers configured for information processing. Thus, the post processing server should not be construed as limited to the form shown in FIG. 4.

Figure 11:
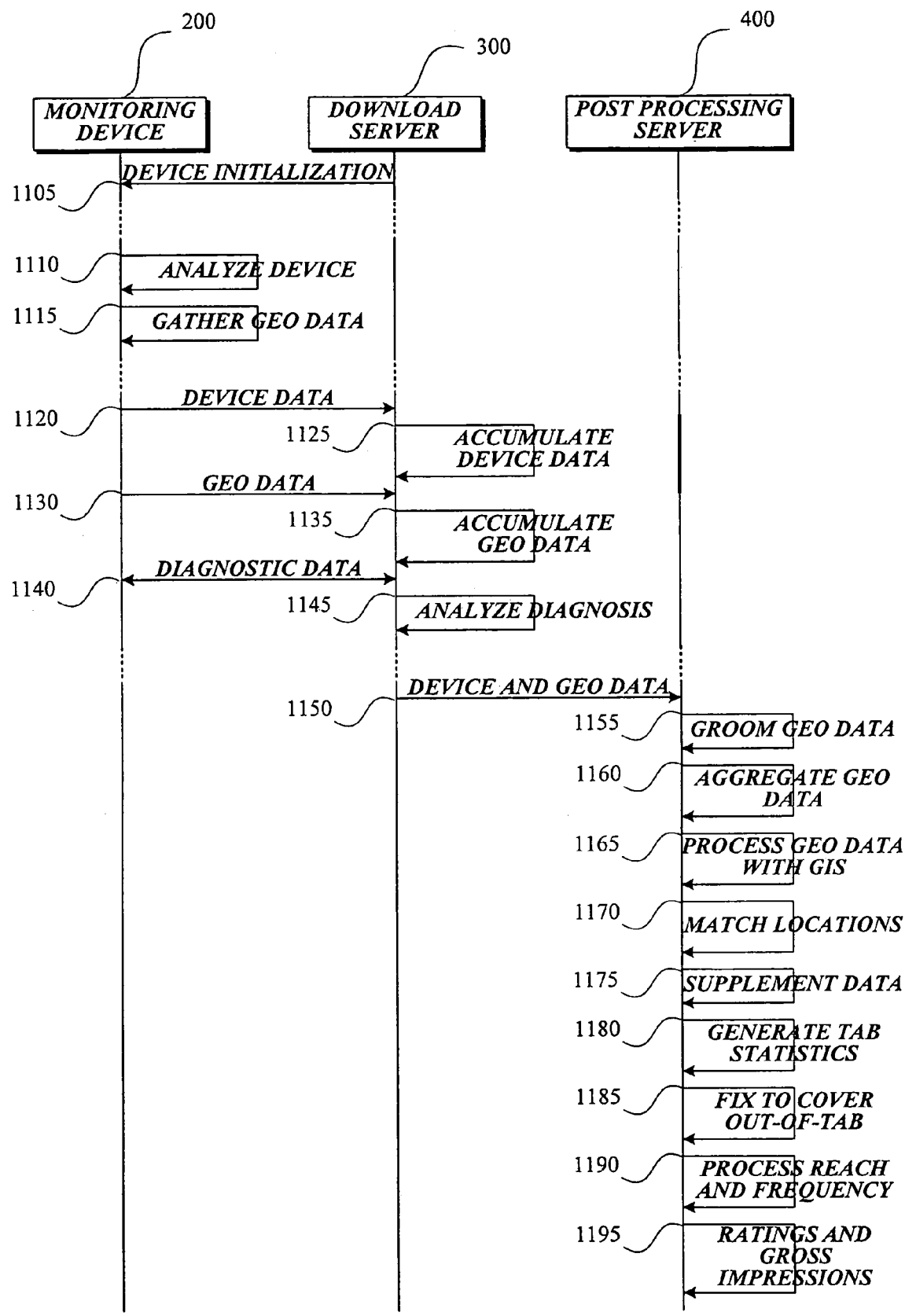
FIG. 11 is a diagram illustrating interactions between a monitoring device, a download server, and a post processing server for determining media display effectiveness statistics in accordance with the present invention.

As illustrated in FIGS. 1, 2, and 11 (described below), the monitoring devices of the display media assessment system 100 are used to track demographically identified individuals ("respondents"). The tracking or geo data is used to determine the exposure of the respondents to various media displays.

Figure 5:
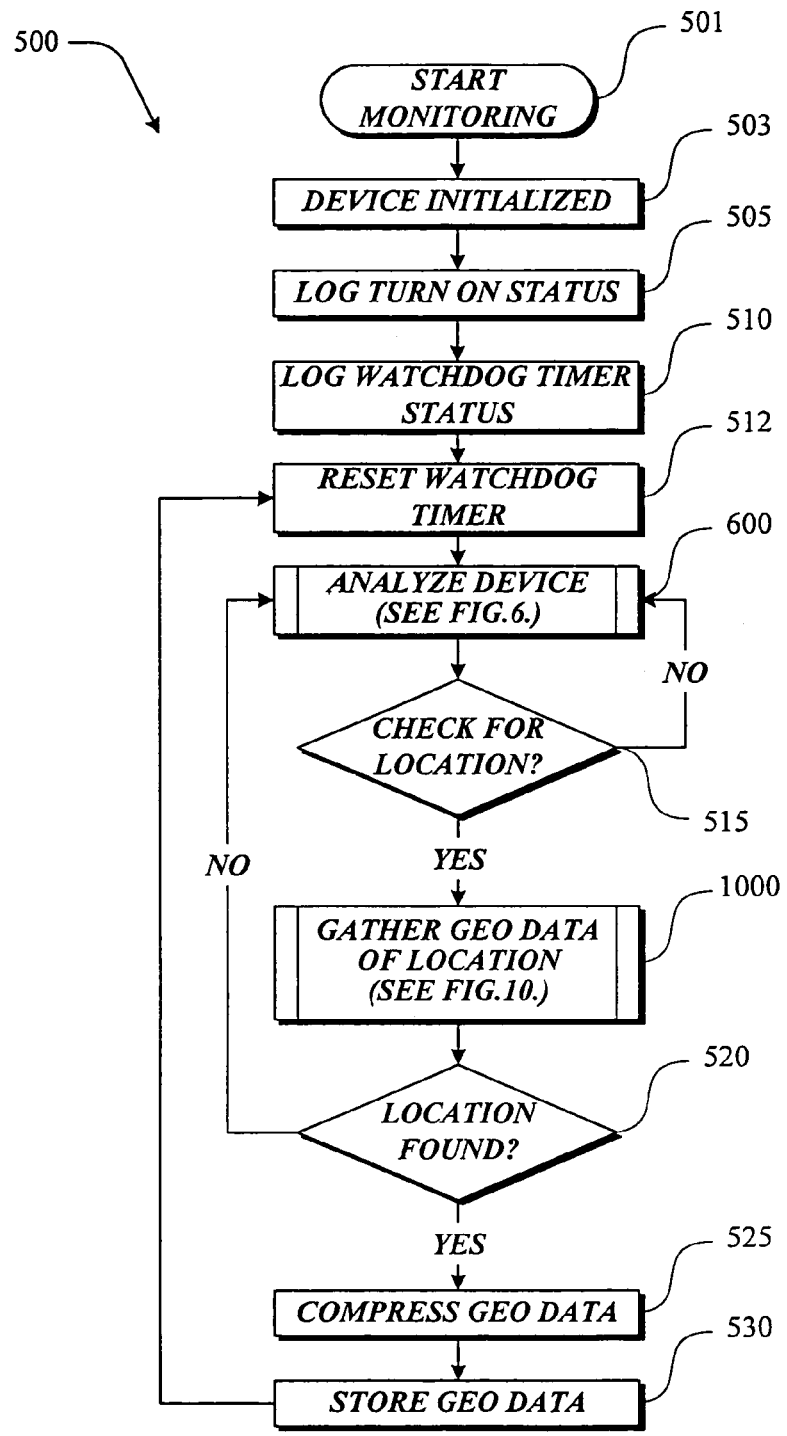
FIG. 5 is an overview flow diagram illustrating a monitoring routine resident in a monitoring device formed in accordance with the present invention.

A flow chart illustrating an exemplary monitoring routine 500 implemented by the monitoring devices 200 is shown in FIG. 5. Prior to starting monitoring, all necessary variable data, such as a respondent's demographic data, RF zone data, profile data, is downloaded to the monitoring device.

Figure 10:
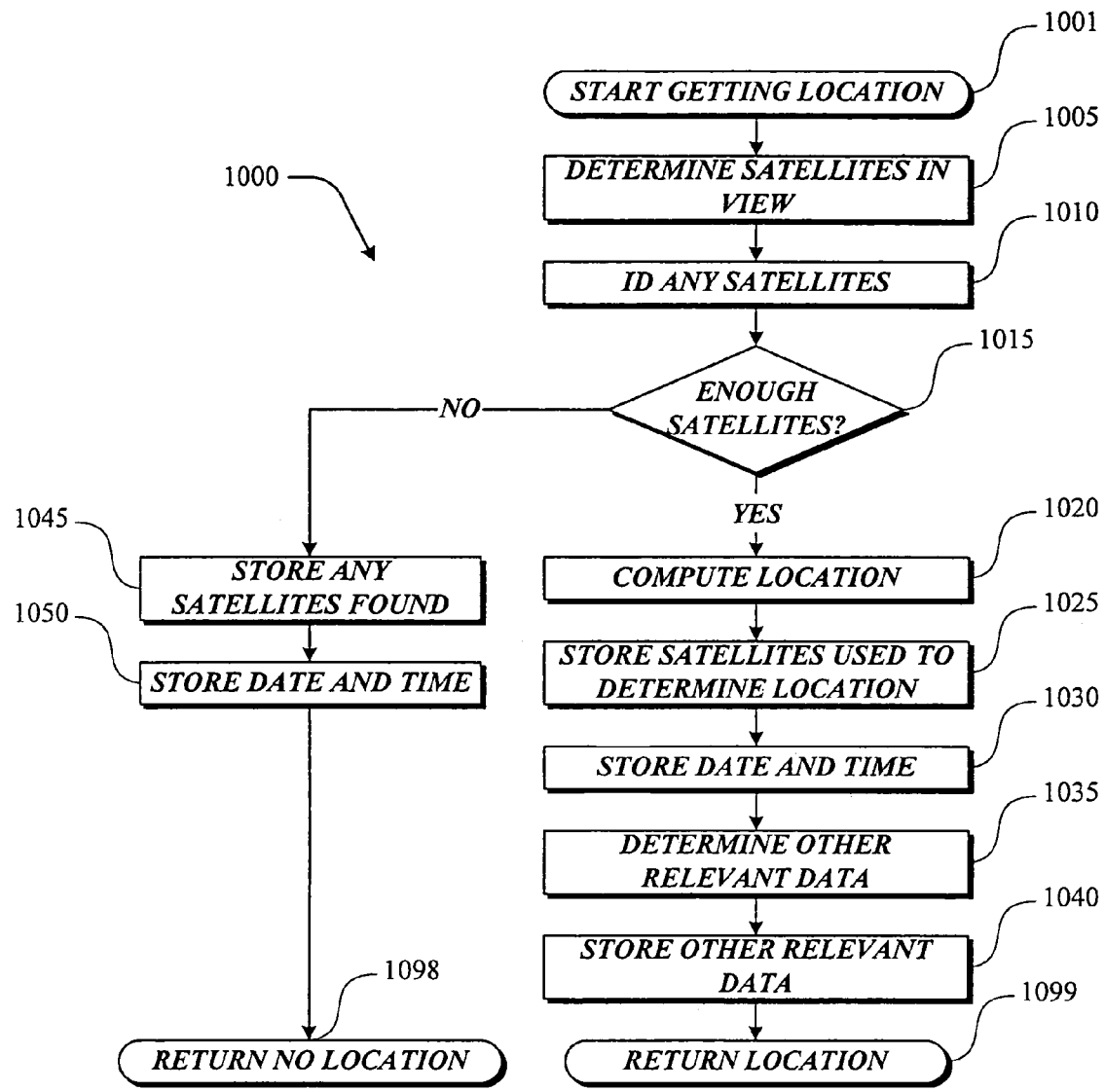
FIG. 10 is an overview flow diagram illustrating a location determination subroutine suitable for use in FIG. 5.

The monitoring routine 500 begins at block 501 and proceeds to block 503 where the monitoring device is initialized. Next, in block 505 the monitoring device's status as having just been turned on is logged. Exemplary information that may be logged at block 505 are the date, time, and location (if available) of the monitoring device 200. Next, in block 510 the status (expired or not expired) of a watchdog timer is logged. Then in block 512 the watchdog timer is reset. While not necessary to all embodiments of the present invention, the watchdog timer is used to restore device function in the case of a crash or other error. The operation of the watchdog timer is discussed in greater detail below in connection with a device analysis subroutine 600 shown in FIG. 6. Processing next proceeds to the device analysis subroutine block 600, where the monitoring device 200 is analyzed. After the device analysis subroutine 600 returns, processing proceeds to decision block 515 where a determination is made whether sufficient time has passed (as specified in the current profile data 270) to check for the current location of the monitoring device 200. If it was determined that a location check should not be made, processing cycles back to the device analysis subroutine 600, or in the alternative, may wait until a location check is desired/required. In any case, after it has been determined that a location check should be performed, processing continues to a geo data gathering subroutine 1000. An exemplary geo data subroutine 1000 is illustrated in FIG. 10 and described below. As will be better understood from the description below, the geo data gathering subroutine gathers data about the location of the monitoring device 200. After the geo data gathering subroutine 1000 returns, processing continues to decision block 520, where a determination is made whether the location of the monitoring device was found during the pass through the geo data gathering subroutine 1000. If a location was not found, processing cycles back to the device analysis subroutine 600. If, however, in decision block 520, it was determined that a location was found, processing continues to block 525, where the geo data is compressed. Those of ordinary skill in the art and others will appreciate that compressing data reduces memory requirements and may increase the power life of the monitoring device, as less power is needed to store a smaller amount of information. However, it will also be appreciated that compressing the geo data is an optional step that may be unnecessary if sufficient memory and power are available. Next, in block 530, the geo data is stored for later retrieval. Processing then loops back to the reset watchdog timer block 512. The monitoring routine 500 continues processing until interrupted by either turning off the monitoring device 200, or the monitoring device 200 loses power.

In order to ensure the accuracy and reliability of the measurements at the monitoring device 200, monitoring device analysis (block 600) is included to routinely assess the status of the monitoring device 200. Such analysis not only provides greater confidence that the data produced by the monitoring device 200 is accurate, it also can be used to enhance the monitoring time and accuracy of the monitoring device 200 by prolonging the useful life of a power supply by controlling the frequency of data gathering which is determined by the selected device profile data 270.

Figure 6:
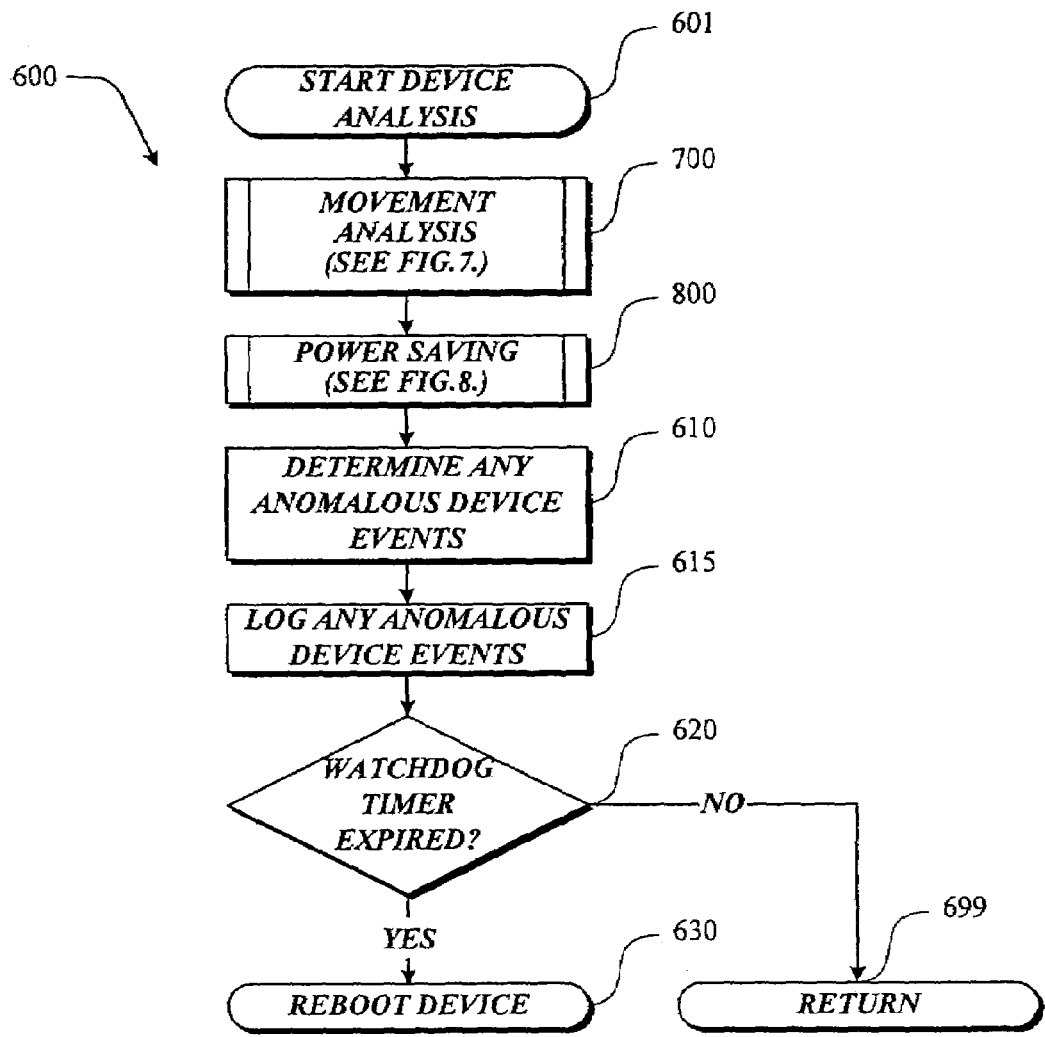
FIG. 6 is an overview flow diagram illustrating a device analysis subroutine suitable for use in FIG. 5.
Figure 7:
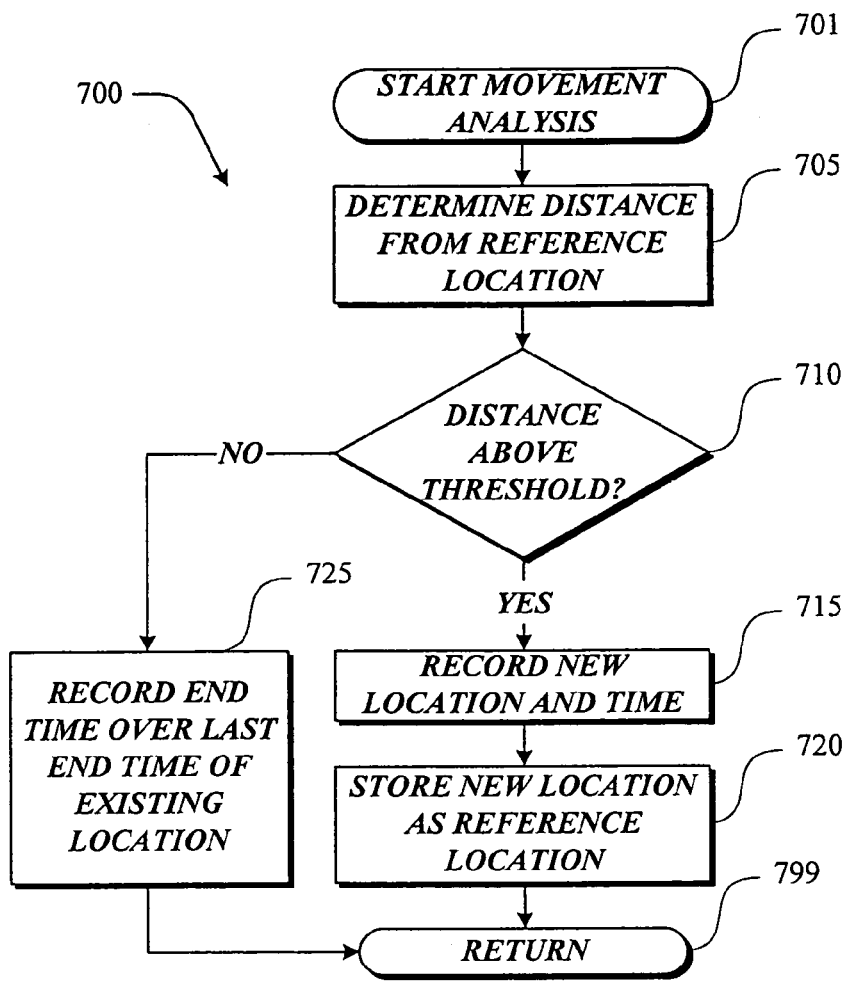
FIG. 7 is an overview flow diagram illustrating a movement analysis subroutine suitable for use in FIG. 6.
Figure 8:
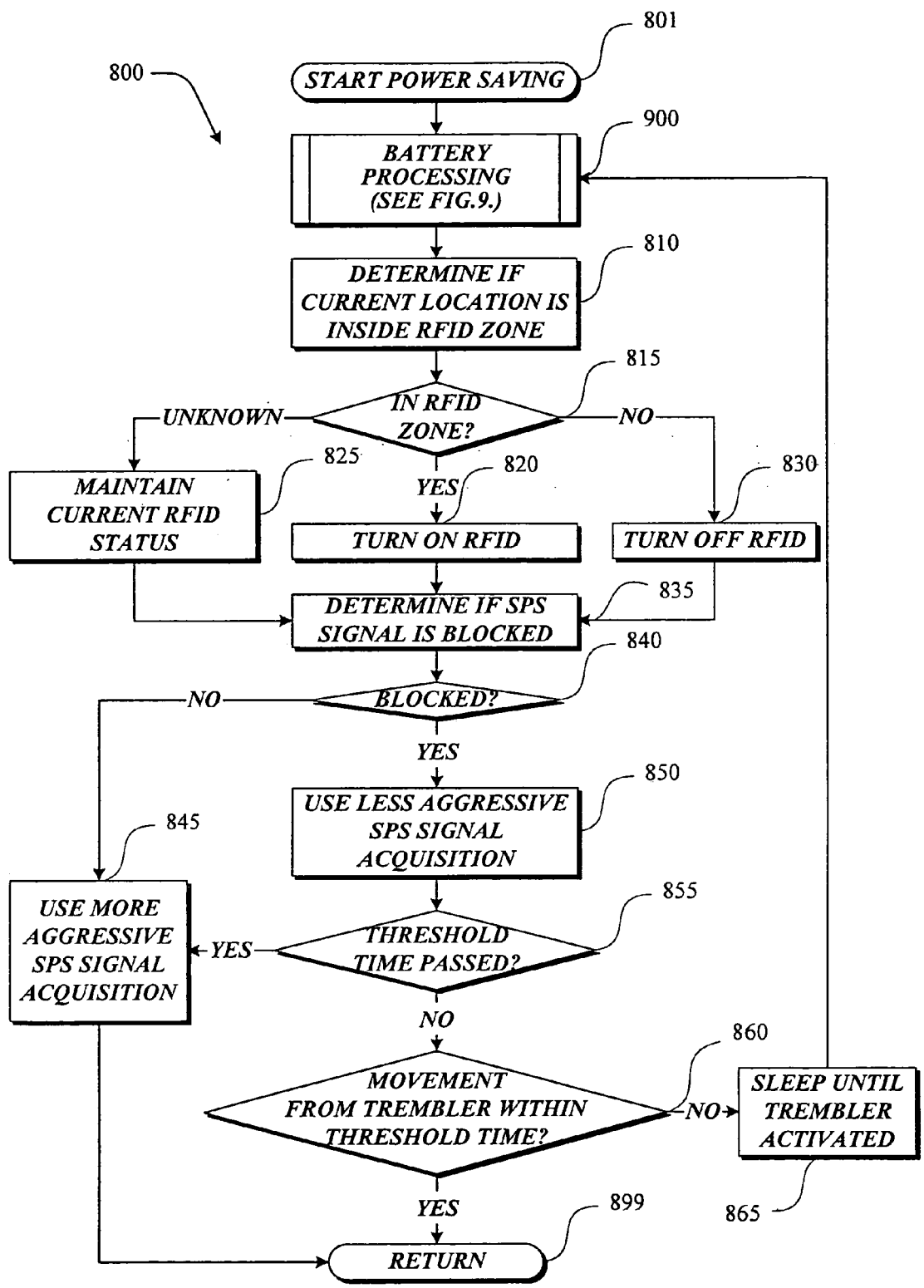
FIG. 8 is an overview flow diagram illustrating a power saving subroutine suitable for use in FIG. 6.

As noted above, the monitoring routine 500 may include an optional device analysis subroutine 600. FIG. 6 is an exemplary illustration of a suitable device analysis subroutine 600. Subroutine 600 begins at block 601 and proceeds to a movement analysis subroutine block 700. A suitable movement analysis subroutine 700 is illustrated in FIG. 7 and described in detail below. Briefly, the movement analysis subroutine 700 determines whether the monitoring device has moved a certain distance from a previous location. Failure of the monitoring device to move indicates that a respondent has remained at a particular location for an extended period of time. Routine 600 then continues to a power saving subroutine 800. A suitable power saving subroutine 800 is illustrated in FIG. 8 and described in detail below. In general, the power saving subroutine 800 causes the monitoring device 200 to operate in a more efficient manner, while still taking into account the desired/anticipated monitoring functions that will be required of the monitoring device 200. Next, in block 610, a determination is made whether any anomalous device events have been detected. Anomalous device events are any unexpected/out-of-bounds values present in the device data. Any detected anomalous device events are then saved in block 615. Next, in decision block 620, a determination is made whether the watchdog timer has expired. The watchdog timer expires if it is not timely reset during cycles through the monitoring routine 500 (FIG. 5) described above. Expiration of the watchdog timer is evidence of a catastrophic error in the monitoring device 200. More specifically, as noted above and shown in FIG. 5, the loop in which the watchdog timer is reset is always cycling. Expiration of the watchdog timer indicates a failure of the monitoring routine 500 to cycle and, hence, the occurrence of a catastrophic error. In such a scenario, a complete "reboot" of the monitoring device 200 is desirable. In one exemplary embodiment of the invention, rebooting acts as a power cycling instruction to the device such that monitoring routine 500 restarts at block 501. Note that in monitoring routine 500 at block 510, the watchdog timer status is logged. Therefore, a reboot instruction (block 630) would be logged at block 510. If, however, in decision block 620, it was determined that the watchdog timer has not expired, processing continues to block 699, where the device analysis subroutine returns to its calling routine.

As noted above, the data gathering operation of the monitoring device 200, can be enhanced by including a movement analysis subroutine 700. An exemplary movement analysis subroutine is illustrated in FIG. 7. As described more fully below, the movement analysis subroutine determines whether the monitoring device 200 has moved a sufficient distance to warrant indicating that the monitoring device and thus a person using the monitoring device has moved to a new location. Analyzing the movement of the monitoring device makes it possible to determine dwell time (time spent at a particular location) so as to enhance the assessment of any media displays in the area that may have captured a respondent's attention.

The movement analysis subroutine 700 begins at block 701 and proceeds to block 705, where a measure is made of the distance between a reference location and the current location of the monitoring device. The reference location is the last location that the monitoring device 200 was at that was sufficiently different from a previous reference location to warrant recording a new location. As discussed more fully below, the sufficiency determination is based on a threshold that can be set to different levels in accordance with the selected profile data 270. It should be noted that when the monitoring device is first turned on there may not be a reference location. Therefore, the first location is always a reference location, as well as the current location. Next, in decision block 710, a determination is made whether the distance from the reference location is above a threshold. This threshold may be a fixed threshold or an adaptive threshold. A fixed threshold distance is specified in the profile data 270.

An adaptive threshold depends on factors other than just distance, such as the respondent's location and/or movement patterns and/or speed. For example, if the monitoring device determines that a respondent is moving at vehicle speeds (e.g., over 10 mph) the threshold distance may be increased (to indicate vehicle movement). Alternatively, if a respondent is in a pedestrian only area that is rich in media displays, the threshold distance may be lowered, to provide for a more granular determination of a respondent's exposure to media displays. Whether or not a pedestrian is located in an area rich in media displays is readily determined by storing information about such locations in memory and comparing the current location of the monitoring device to such locations. Like the fixed threshold distance, the selected profile data 270 contains movement parameters with which to set an adaptive threshold.

Returning to decision block 710, if it was determined that the distance from the reference location was not above the threshold, processing continues to block 725, where the ending time of the time spent at the reference location is updated with the current time. If, however, in decision block 710 it was determined that the distance was above a threshold, processing continues to block 715, where a new location and time are recorded as geo data. Additionally, in block 720, the new location is stored as the new reference location. In either case, after block 720 or block 725, the movement analysis subroutine 700 proceeds to block 799, and returns to the calling routine.

As noted above, preferably, the device analysis subroutine 600 (FIG. 6) also includes a power saving subroutine 800. Power savings is of significant value because power sources (batteries, fuel cells, capacitors and the like) make a contribution to the size and/or weight of a monitoring device 200. Accordingly, a small power source is desirable yet a small power source usually means less power. The monitoring device offsets the lower of power resulting from the use of smaller power sources by more efficiently determining when to use more and when to use less power. A power saving subroutine 800 suitable for accomplishing this result is illustrated in FIG. 8 and described next.

Figure 9:
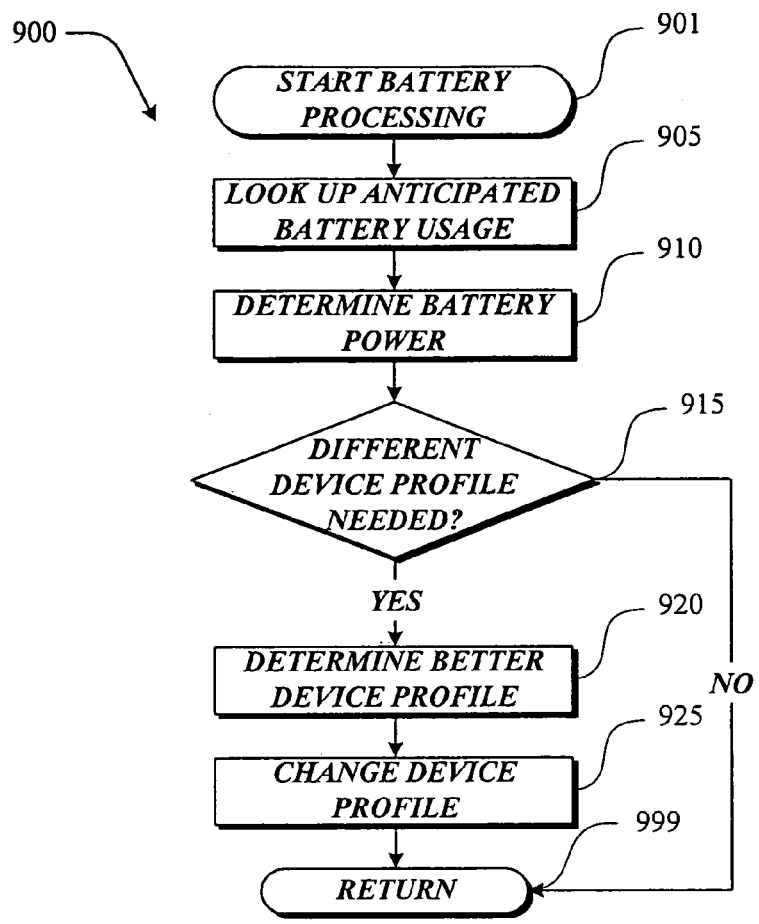
FIG. 9 is an overview flow diagram illustrating a battery-processing subroutine suitable for use in FIG. 8.

The power saving subroutine 800 begins at block 801 and proceeds to a battery processing subroutine block 900 (illustrated in FIG. 9 and described below). After the battery processing subroutine 900 ends, the power savings subroutine 800 proceeds to block 810 and then block 815, where a determination is made whether the current location is inside an RFID (radio frequency identification) zone. An RFID zone is a zone within which the monitoring device is within communication range of an RFID device, i.e., a device that transmits RF signals or receives RF signals. Whether the monitoring device is within an RFID zone can be determined by storing the location of such zones in the memory of the monitoring device and periodically comparing the current location of the monitoring device with the stored locations of such zones. The determination is made by periodically checking the device profile data 270 for any listed RFID zones.

If, in decision block 815, it was found that the current location is inside an RFID zone, the optional RFID functionality of the monitoring device 200 is turned on in block 820. If, however, in decision block 815 it was found that the current location is not inside an RFID zone, the optional RFID functionality of the monitoring device 200 is turned off at block 830. If in decision block 815 a determination could not be made as to whether the current location is inside or outside an RFID zone, the status is unknown and the current RFID status is maintained in block 825. Enabling the RFID functionality only when the monitoring device is located in zones that have been designated as RFID zones (in profile data 270) allows the monitoring device 200 to use less power. Less power is used because the RF location component 240 is not enabled when it is not needed (i.e., when the monitoring device is outside of RFID zones). Typical RFID zones will be areas with media displays, but with little or no SPS coverage (e.g., subway stations, malls, stadiums, etc.). In any case, after turning on, turning off, or maintaining the current RFID status, processing continues to block 835, where a determination is made whether SPS signals are blocked.

Those of ordinary skill in the art and others will appreciate that while there are a plurality of SPS signal broadcasting devices (satellites, pseudolites, etc.), signals from these devices may be blocked on occasion. This is particularly common underground and within substantial buildings. If SPS signals are blocked, useful location (geo) data cannot be obtained. An adverse effect on the power source of a monitoring device will occur if the monitoring device 200 constantly attempts to reacquire SPS signals when in areas where such signals are blocked. Therefore, if in decision block 840 it is determined that SPS signals are blocked, in block 850 the monitoring device is instructed to use a less aggressive SPS signal acquisition profile. Less aggressive, may mean using a lower power signal acquisition method, or trying to acquire SPS signals less often, or trying to acquire SPS signals for shorter periods of time. If in decision block 840 it was found that SPS signals were not blocked, in block 845 the monitoring device 200 is instructed to use a more aggressive (e.g., more powerful signal acquisition method or more frequent checks for SPS signals or checks for longer periods of time per check) SPS signal acquisition profile. After block 845, processing continues to block 899 where the power saving subroutine 800 returns to its calling routine.

If the monitoring device 200 was instructed in block 850 to use a less aggressive SPS signal acquisition profile, processing proceeds to decision block 855 where a test determines if a threshold time limit has passed. The time limit may be established by a predetermined number of calls to the power saving subroutine 800, or after a predetermined period of time has passed. If the threshold time limit has passed, the power saving subroutine 800 proceeds to block 845 where a more aggressive SPS signal acquisition routine is instituted. In this regard, those of ordinary skill in the art and others will appreciate that a SPS signal may be temporarily blocked. The monitoring device 200 would be less accurate if required to permanently employ a less aggressive SPS signal acquisition profile once such a profile is initiated, hence the decision (block 855) to periodically change the profile back to more aggressive SPS signal acquisition.

If in decision block 855 it was determined that the threshold time limit has not passed, then in decision block 860 a further determination is made whether any movement of the monitoring device has occurred within a predetermined period of time. This determination is made by monitoring the output of the trembler 215 (FIG. 2) to determine if the trembler detected movement within the predetermined period of time. The predetermined period of time is continued in the profile data. An exemplary range is 2–15 minutes. This range is merely meant as an example and not meant to limit the range of predetermined periods of time employed by actual embodiments of this invention. The trembler acts as an indicator of whether the monitoring device 200 is actually in use. If, for example, the monitoring device has been placed on a bedside table, indicating that the associated respondent is no longer exposed to media displays, it is more power efficient to adjust the monitoring device so that the monitoring device consumes less energy. Accordingly, if in decision block 860 movement is detected, processing continues to block 899 where the battery saving subroutine 800 returns to its calling routine. If, however, in decision block 860 it was determined that there has been no movement detected by the trembler within a threshold time, processing continues to block 865 where the monitoring device 200 is placed in a sleep mode until the trembler detects movement. After the trembler detects movement, processing cycles back to the battery processing subroutine 900.

As will be readily understood by those skilled in the art and others, the monitoring device 200 is used by respondents over extended periods of time. Accordingly, it is desirable to continually assess whether there is sufficient battery (fuel cell, capacitor, etc.) power to keep the monitoring device 200 in operation for the anticipated duration of the study. Such battery assessment can be used to control power usage and, thus, extend the operation time of the monitoring device. FIG. 9 is an exemplary illustration of a suitable battery processing subroutine 900 directed to accomplishing this result.

The battery processing subroutine 900 begins at block 901 and proceeds to block 905 where the device checks its anticipated battery usage requirements. Next in block 910, the monitoring device 200 determines available battery power. After which, in decision block 915 a determination is made whether a different device profile is needed. This determination compares both the current battery power availability, the anticipated battery usage requirements, and the indicated profile for the current study of the monitoring device 200. For example if the current level of battery power availability is below the anticipated usage requirements, a lower power profile may be substituted for the current profile. Conversely, a higher power profile may be substituted if a available battery power is greater than expected. For example, if the current study of the monitoring device is monitoring an urban area for a two-week period, the determination of whether a different device profile is needed will depend on current battery power availability and the anticipated battery usage requirements of the monitoring device 200 and whether it will be able to adequately provide location information within an urban environment for the remainder of its monitoring period.

If in decision block 915 it was determined that a different device profile is not required, the battery processing subroutine 900 proceeds to block 999 where it returns to its calling routine. If however, it was determined in decision bock 915 that a different device profile was needed, in block 920 a better device profile is determined. For example, if the thresholds that have been set for the movement analysis subroutine 700 have resulted in repeated location checks that do not indicate that a monitoring device has moved from a referenced location, a more power efficient profile that causes the monitoring device to make less frequent location checks is chosen. Alternatively, if the movement analysis subroutine 700 finds that the threshold distance is always exceeded, a profile that increases the threshold distance to try and capture a "flighty" respondent is chosen. Next, in block 925, the profile of monitoring device 200 is changed and processing proceeds to block 999 where subroutine 900 returns to its calling routine.

Although an extensive analysis of the operation of the monitoring device 200 is desirable, such an analysis is not essential to embodiments of the invention. The main purpose is to accurately track respondents. As generally noted above, the monitoring device 200 achieves this result by continuously determining a respondent's location, i.e., the location of a person carrying or in some other way associated with a monitoring device, and periodically storing the results of the determination. Monitoring device location is determined using either just SPS or SPS in combination with RF. RF location may include an RF interrogator mounted in the monitoring device 200 for interrogating an RF transponder and/or an RF transmitter for transmitting identification data for receipt by RF receivers when a monitoring device is sufficiently close to a receiver associated with a media display. Thus, depending on implementation, RF location determination can be considered somewhat equivalent to SPS satellite location determination, particularly if the monitoring device 200 receives information from prepositioned RF transponders in a manner similar to the way the monitoring device receives information from satellites. In this regard, those of ordinary skill in the art and others will appreciate that there are technical differences between SPS satellites, pseudolites (RF devices that, while not satellites, broadcast SPS satellite-type information) and RF transponders. Because of the similarity and in order to avoid unnecessary duplication, for purposes of the location getting subroutine 1000, all received location signals are referred to as satellite signals. This in no way is meant to limit the present invention to only utilizing satellites for determining location.

The location getting subroutine 1000 (FIG. 10) begins at block 1001 and proceeds to block 1005 where it is determined if satellites are in view, i.e., if the monitoring device is receiving satellite signals. Then, in block 1010, the satellites whose signals are being received are identified. Next, in decision block 1015, a determination is made whether there are a sufficient number of satellites to obtain a location. One of ordinary skill in the art and others will appreciate that different implementations of the present invention will require a different number of satellites with which to provide suitably accurate location information. In general, conventional SPS engines require receiving signals from four or more satellites if an accurate location is to be determined. However, less than four satellite signals may be used if less accuracy is acceptable, or if there are additional known pieces of information (e.g., altitude, latitude or longitude). These additional pieces of information could come from other directional units 235 of a monitoring device 200. RFID systems and pseudolite systems may rely on less than three signals and still provide suitably accurate location information. One RFID and pseudolite signal source may be sufficient if elevation information is not required. Similarly, a single satellite signal may be sufficient if combined with known data, such as GIS information obtained from the GIS database 125.

If in decision block 1015 it was determined that signals from enough satellites (or other devices) are being received, in block 1020 the current location of the monitoring device 200 is computed and stored. Next, in block 1025 information identifying the satellites that were used to determine the current location are stored. Additionally, in block 1030, the current date and time are stored. Optionally, in block 1035 other relevant data, such as satellite signal level, individual pseudo-ranges of satellites (raw signal), augmentation data (e.g. WAAS or Wide Area Augmentation System data) and carrier phase (phase of radio wave from satellite) is determined, i.e., detected. In block 1040, the other relevant data is stored. Finally, in block 1099, the current location is returned to the calling routine. If, however, in decision block 1015, it was determined that not enough satellite signals were available, processing proceeds to block 1045 where information identifying the satellites that signals were received from are stored. Then in block 1050, the date and time are stored. As an insufficient number of satellite signals were available to calculate a location, processing continues to block 1098 where an indication that no location was found is returned to the calling routine. Regardless of which path is followed, after the location or no location result is returned, the location getting subroutine 1000 returns to the calling routine.

The RF location component 240 of the present invention may be operative in a number of different manners. In one exemplary embodiment, the RF location component 240 "chirps" out a low power signal with an identification that is then identified by one or more receiving RF devices at or near media displays. The strength of the signal may be monitored by the receiving RF device, such that only a signal of sufficient strength indicates an exposure to the media display. In an alternate embodiment, media displays have RF devices that broadcast a low power chirp that identifies of their location, such that the monitoring device 200 is able to record locations even when a SPS signal is not present. Similarly, the strength of the broadcast is monitored by the monitoring device 200, such that only a signal of sufficient strength indicates presence at a particular location (or is of such low power that any reception indicates presence at a particular location). In still another embodiment, the media displays have RF devices that broadcast a chirp or beacon of an identifier, such that the monitoring device 200 is then able to record identifiers of specific media displays. Again, the strength of the broadcast is monitored by the monitoring device 200, such that only a signal of sufficient strength indicates presence at a particular location (or is of such low power that any reception indicates presence at a particular location).

The operation of the display media assessment system 100 (FIG. 1) of the present invention will be better understood by reference to FIG. 11, which illustrates an exemplary sequence of interactions between devices of the system 100. As noted above, the display media assessment system 100 illustrated in FIG. 1 includes a monitoring device 200, a download server 300 and a post processing server 400.

Turning to FIG. 11, a media display assessment sequence is initiated when a monitoring device 200 receives initialization information 1105 from a download server 300 or other suitable device. As noted above, the initialization information or data may include respondent demographic data, RF zone data, profile data, etc. After the monitoring device 200 has been initialized, monitoring can begin. Monitoring may commence immediately or after a period of time. In any case, after the monitoring device is initialized, i.e., ready to gather geo data, the monitoring device analyzes itself 1110 and then proceeds to gather geo data 1115. Geo data gathering continues until the geo gathering is interrupted due to power source wearing out or the monitoring device being instructed to stop gathering geo data (e.g., because an OFF key is enabled). After geo data gathering is complete, or at periodic intervals, gathered geo data is downloaded from the monitoring device 200 to a download server 300. More specifically when the monitoring device 200 is ready to download, device data 1120 is first transferred from the monitoring device 200 to the download server 300. The device data includes data gathered by the monitoring device 200 about itself (e.g., device diagnostic data, power consumption data, etc.). The download server 300 adds 1125 the download device data to any previously received device data. For example, if multiple monitoring devices 200 store device data, the download server 300 would gather all this information together. After the device data 1120 has been downloaded to the server, the monitoring device 200 downloads geo data 1130 to the download server 300. The downloaded geo data is accumulated 1135. Next, the monitoring device 200 and the download server 300 may engage in a bidirectional exchange of diagnostic data 1140, i.e., the monitoring device receives and responds to specific diagnostic requests from the download server 300. The download server 300 then analyzes the diagnostic data 1145.

Preferably, data from multiple monitoring devices 200 is downloaded to the download server 300 in the manner described above. After downloading the device and geo data 1150 are downloaded from the download server 300 to the post processing server 400, the post processing server 400 performs a plurality of functions. Initially the post processing server grooms 1155 the geo data to improve its accuracy. Next, the geo data is aggregated 1160 into queryable results. The aggregated geo data is further processed 1165 using information derived from the GIS database 125. Locations in the processed geo data are then matched 1170 to known locations of publicly viewable media displays. Next, the post processing server generates in tabulation ("in-tab") and out of tabulation ("out-of-tab") statistics 1180 which are used to determine what information is accurate and should be preserved. In-tab data is data that is said to have come from an accurate source (e.g., a well-functioning monitoring device 200 and a cooperating respondent). Out-of-tab data is said to be unusable for some reason (such as from a malfunctioning monitoring device 200, corrupted data, and/or an uncooperative respondent). The geo data and matched locations are then fixed 1185 to cover any out-of-tab data that has been removed. The fixed data is used to determine reach and frequency 1190 statistics for the media displays. The reach and frequency statistics are then used to provide rankings and gross impressions 1195 for the media displays.

As will be appreciated by those of ordinary skill in the art and others, FIG. 11 illustrates one exemplary set of interactions between the devices of system 100. It will also be appreciated by those of ordinary skill in the art and others that additional interactions and selections may be employed by actual embodiments of the invention. Additionally, it will be appreciated by those of ordinary skill in the art and others that the actions illustrated in FIG. 11 may be performed in other orders, or may be combined. For example, geo data may be downloaded before device data to the download server 300. Thus, FIG. 11 and the foregoing description should be taken as illustrative, not limiting.

Figure 12:
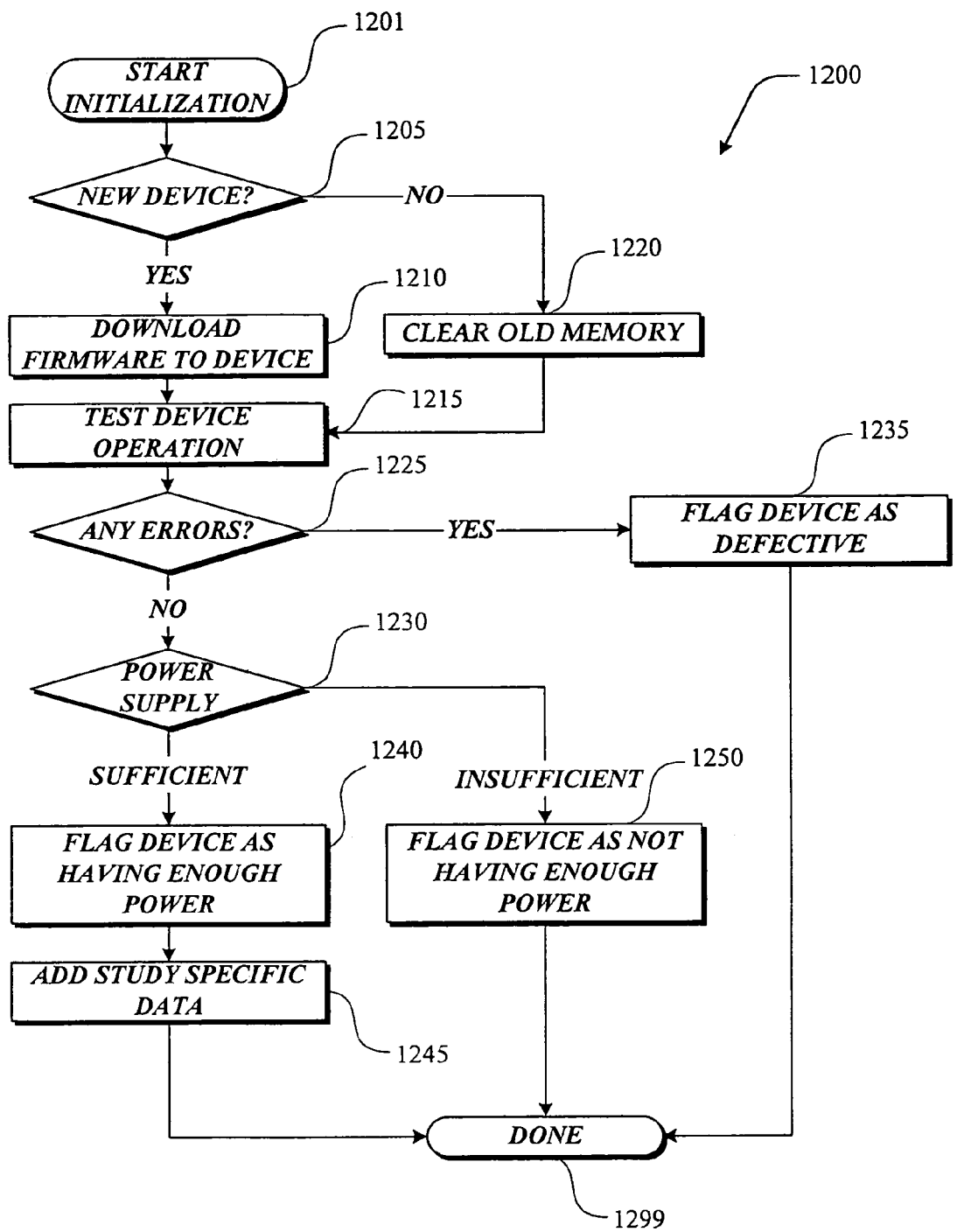
FIG. 12 is an overview flow diagram illustrating an initialization routine resident in a download server formed in accordance with the present invention.

As illustrated in FIGS. 1, 3 and 11, the exemplary embodiment of the display media assessment system 100 described herein includes a download server 300 that is used to retrieve information from monitoring devices 200. Additionally, the download server is operative to initialize monitoring devices 200. A flowchart illustrating an exemplary device initialization routine 1200 and a data download routine 1300 formed in accordance with the present invention are shown in FIGS. 12 and 13, respectively, and described next.

The monitoring device initialization routine 1200 begins at block 1201 and proceeds to decision block 1205 where a determination is made whether the device to be initialized is a new device, or one that has been used previously. If it was found in decision block 1205 that a new monitoring device 200 is to be initialized, processing continues to block 1210 where new firmware is downloaded to the monitoring device 200. If however in decision block 1205 it was determined that a previously initialized monitoring device 200 is to be initialized, processing continues to block 1220 where any device and/or geo data stored in memory is cleared. Regardless of whether a new device or a previously initialized monitoring device 200 is being initialized, processing continues to block 1215 where the monitoring device's 200 operation is tested, i.e., a series of operational tests not part of the present invention are performed. Next, in decision block 1225, if any errors were detected when testing the operation of the monitoring device 200, processing continues to block 1235 where the monitoring device 200 is flagged as defective, after which processing ends at block 1299. If however in decision block 1225 it was determined that no errors were detected during the operational tests in decision block 1230, a determination is made whether the power supply is sufficient for the monitoring device 200. The sufficiency decision in decision block 1230 may be affected by known and/or projected parameters of how much power a monitoring device 200 may need in an upcoming study (as stored in profile data 270). For example, measurements of the voltage and temperature of a battery power source, can be used to determine an expected level of performance given known average power consumption of monitoring device 200. Alternatively, a fixed voltage level at a particular temperature may be used as a threshold to determine sufficiency of a power supply, for example, 2.8 volts at 70 degrees Fahrenheit (room temperature). Voltage below this level would be regarded as indicating insufficient power. If in decision block 1230 it was determined that the power supply is sufficient, processing continues to block 1240 where the device is flagged as having enough power. Next, in block 1245, study specific data is added to the profile data 270 of the monitoring device 200. In one exemplary embodiment of the present invention, study specific data includes designated zones where RFID measurements are to be taken. Other types of study specific data may include listings of anticipated satellites that should be available, device profiles for determining a location in a metropolitan area, frequency of location inquiries, duration of study, anticipation of time spent indoors or outdoors, and/or end date and time of study. Next, in block 1299, the initialization routine 1200 ends. If in decision block 1230 it was determined that the power supply was insufficient, then in block 1250 the monitoring device 200 is flagged as not having enough power and processing again ends at block 1299.

Besides initializing the monitoring device 200, as shown in FIG. 11, the download server also retrieves information from the monitoring device 200 after a study. This retrieval may be accomplished by any conventional way computing devices communicate with one another (wireless, wire connected, networked, telephone, etc.).

Figure 13:
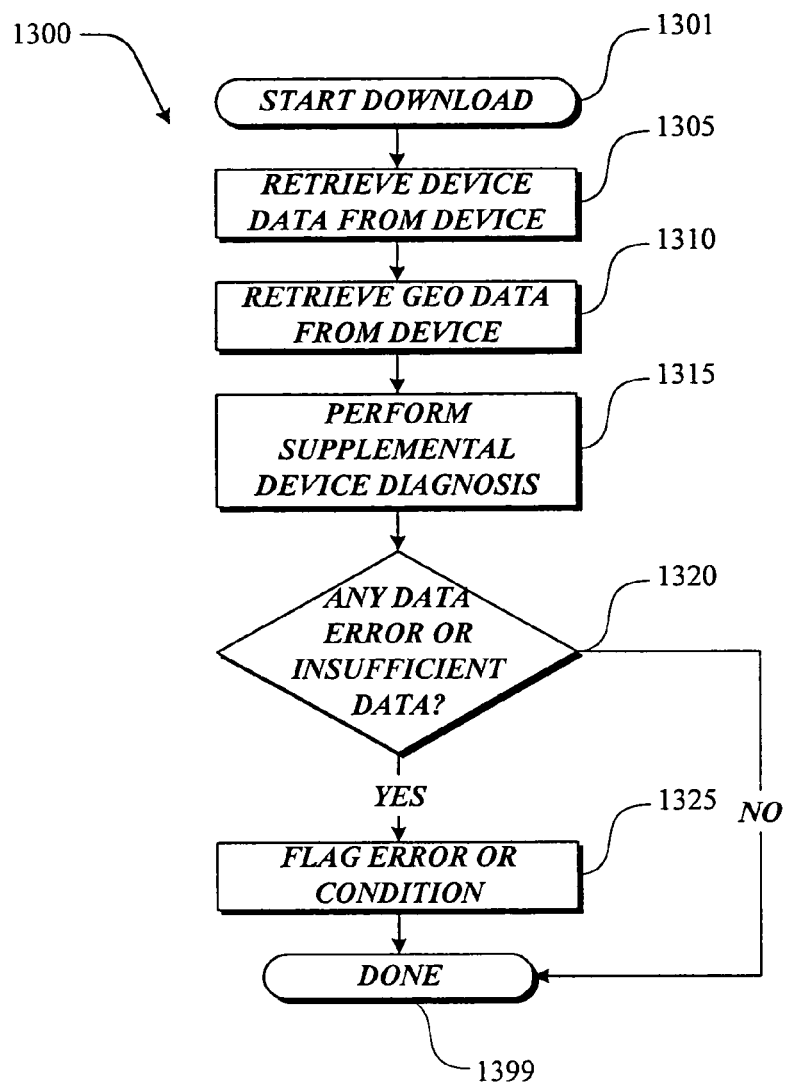
FIG. 13 is an overview flow diagram illustrating a monitoring device download routine resident on a download server formed in accordance with the present invention.

An exemplary download routine 1300 suitable for use by the download server 300 is illustrated in FIG. 13. FIG. 13 begins at block 1301 and continues to block 1305 where geo data is retrieved from the monitoring device 200. Next, in block 1310 device status data is retrieved from the monitoring device 200. Processing then continues to block 1315 where supplemental device diagnostics are performed. As noted above with regard to FIG. 11, supplemental device diagnostics include communication with the monitoring device 200 to determine the current diagnostic status of the monitoring device. In decision block 1320 a determination is made whether any of the received geo data, device status data or the results of the supplemental device diagnostics resulted in anomalous data, data errors or an insufficiency of data. If so, the error or condition is flagged in block 1325 and the anomalous data errors or indication of insufficiency of data is saved to a designated location for further processing. After the anomalous data or data errors have been flagged, processing ends at block 1399. If in decision block 1320 no data errors or insufficiencies were found processing cycles to block 1399 and ends.

Figure 14:
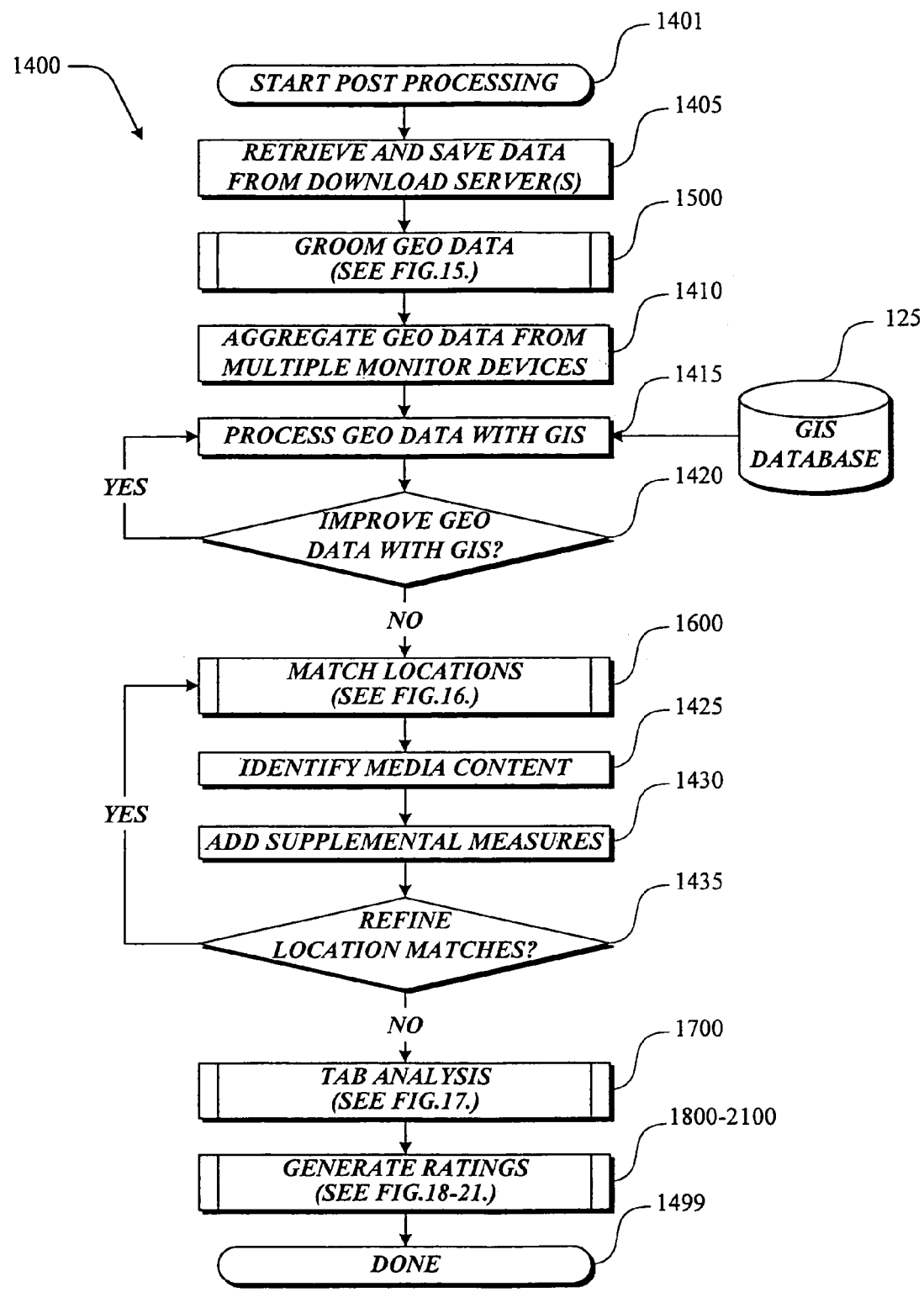
FIG. 14 is an overview flow diagram illustrating a post processing routine resident on the post processing server for further processing information from monitoring devices and the download servers formed in accordance with the present invention.
Figure 15:
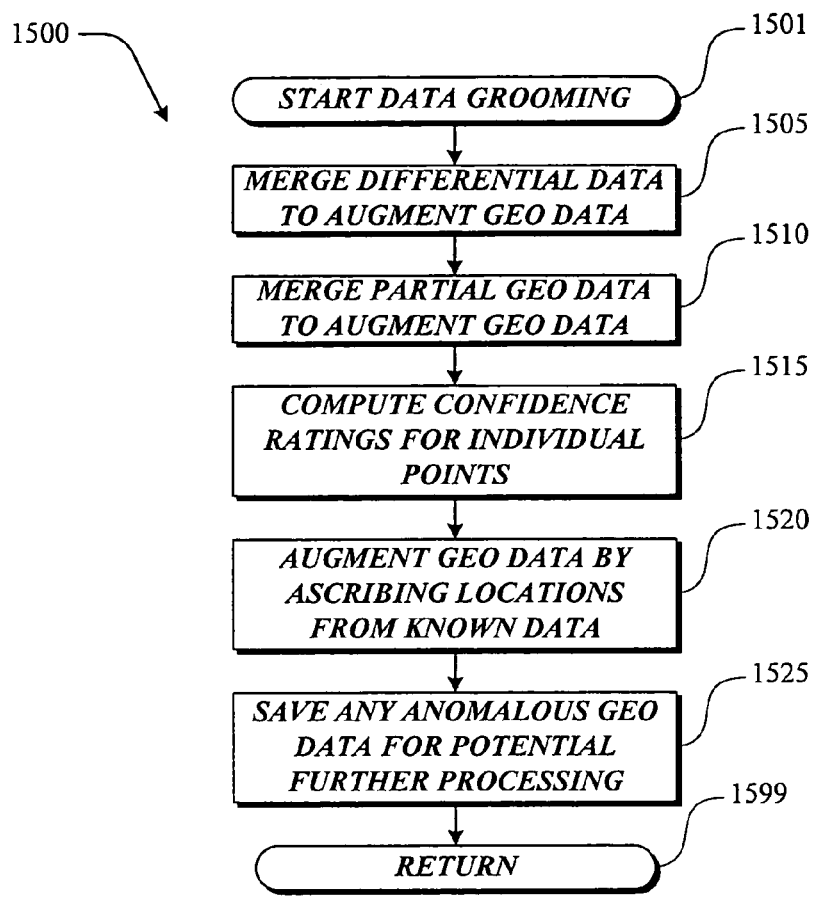
FIG. 15 is an overview flow diagram illustrating an accuracy enhancing geo data grooming subroutine suitable for use in FIG. 14.

As illustrated in FIGS. 1, 4 and 11, the exemplary embodiment of the media display assessment system 100 described herein includes a post processing server 400 that is used to process and assess the data retrieved from monitoring devices 200 by download servers 300. A flowchart illustrating an exemplary post processing routine 1400 suitable for implementation by the post processing server 400 is shown in FIG. 14. The post processing routine 1400 begins at block 1401 and proceeds to block 1405 where data is retrieved and saved from any download servers storing downloaded information obtained from the monitoring devices 200. After the data has been saved, then processing continues to subroutine block 1500 where the geo data is groomed. An exemplary routine for grooming geo data is illustrated in FIG. 15 and described in detail below. After the geo data has been groomed, processing continues to block 1410 where geo data from multiple monitoring devices 200 is aggregated. In one exemplary embodiment, this aggregation entails combining geo data from multiple respondents in the same vicinity to improve knowledge about that area and satellite coverage.

Next, in block 1415, the geo data is further processed with information obtained from the GIS database 125. The GIS processing may be iterative in that multiple passes may further improve the accuracy of the geo data. Accordingly in decision block 1420 a determination is made whether the geo data can be further improved with GIS and if so, processing returns back to block 1415. Processing with information obtained from the GIS database includes eliminating all possible ambiguous SPS location solutions that are not on roads/sidewalks at surface altitude. For example, if the wavefront from a SPS satellite intersects a road at only one location, processing using GIS database information determines that the monitoring device 200 is at that location on the road indicated by the information gathered from the GIS database 125. Ambiguous SPS location solutions may further be reduced using data regarding the speed required to move from a previous known location to a new location.

Figure 16:
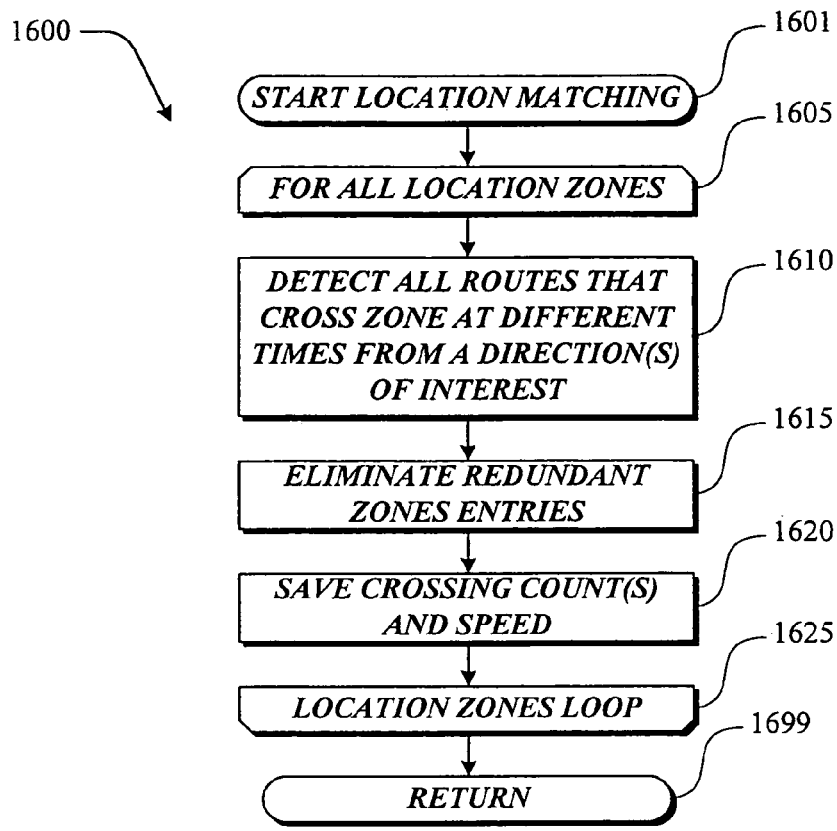
FIG. 16 is an overview flow diagram illustrating a location matching subroutine suitable for use in FIG. 14.

When the geo data has been sufficiently optimized using the GIS database 125, processing continues to subroutine block 1600 where locations of publicly viewable display media are matched to locations where the monitoring devices 200 have been. A suitable location matching subroutine 1600 is illustrated in FIG. 16 and described in detail below.

Those of ordinary skill in the art and others will appreciate that while the location matching subroutine 1600 described below discusses matching monitoring devices locations to the locations of publicly viewable media displays, the location matching subroutine 1600 may also be used to match other types of locations. For example, the location matching subroutine 1600 may be used to match monitoring device locations to potential media display locations as well as other types of locations.

Figure 17:
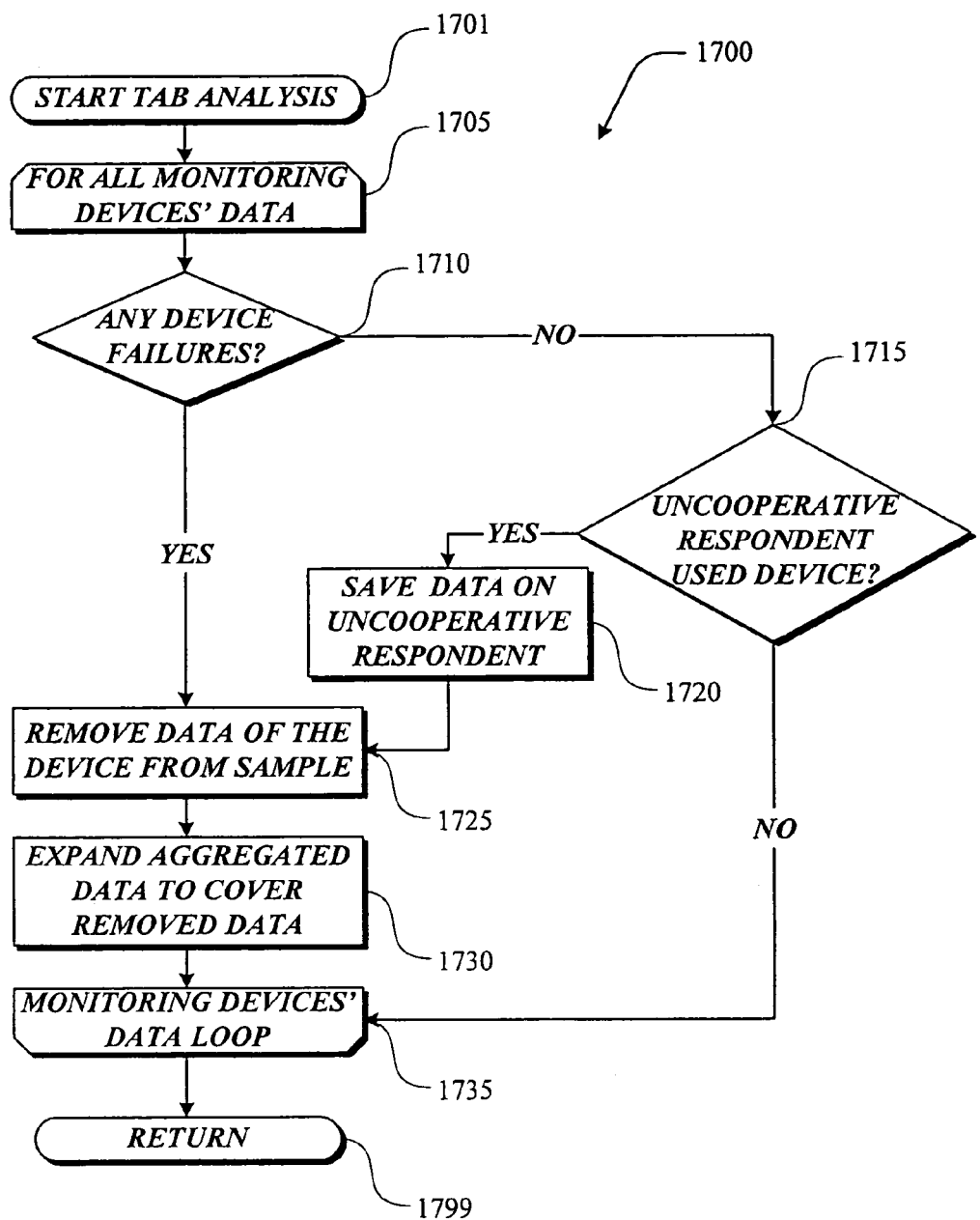
FIG. 17 is an overview flow diagram illustrating a tabulation statistics subroutine suitable for use in FIG. 14.
Figure 18:
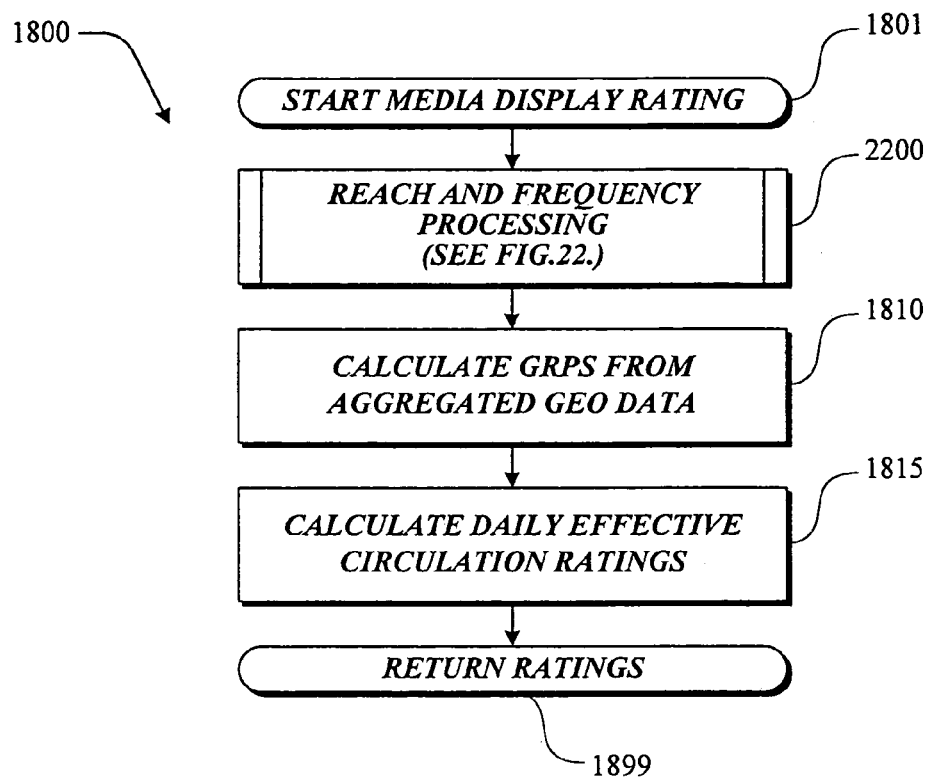
FIG. 18 is an overview flow diagram illustrating a media display rating subroutine suitable for use in FIG. 14.

Next, in block 1425 the content of matched media displays is identified. In one exemplary embodiment, media content identification involves identifying which media displays were matched and then looking up what media content was displayed at the times the monitoring device and the display locations matched. Processing continues then to block 1430 where supplemental measures are added to the data being processed supplemental measures include, but are not limited to, size, angle, lighting, time of day, blocking objects, clutter, and position. Next, in decision block 1435 a determination is made whether the location matches should be refined given the additional information received with regard to existing location matches and the supplemental measures. Supplemental measures may change the threshold for exposure to media displays. For example, an unlighted billboard at night would have a much lower threshold of exposure than the same billboard during the daytime. Similarly, if a building partially blocks a media display from a particular angle, a supplemental measure noting this effect would lower the threshold of exposure at certain locations. If the added supplemental measures information refines the location matches, processing cycles back to subroutine 1600. If on the other hand in decision block 1435 a determination is made that location matches do not need to be refined, processing continues to a tabulation ("tab") analysis subroutine 1700. As noted above, tab analysis is the determination of which data should remain as part of an accurate assessment of the exposure and reach and frequency of media displays. A suitable tab analysis subroutine 1700 is illustrated in FIG. 17 and described in detail below. Processing then continues to a ratings subroutine. Four illustrative ratings subroutines 1800, 1900, 2000 and 2001 are illustrated in FIGS. 18, 19, 20 and 21, respectively, and described in detail below. After the ratings subroutines are completed the post processing routine 1400 ends at block 1499.

As noted above, preferably, the geo data retrieved from monitoring devices 200 is refined in grooming subroutine 1500, an example of which is illustrated in FIG. 15. More specifically, those of ordinary skill in the art and others will appreciate that geo data grooming may be accomplished in many ways. Subroutine 1500 merely illustrates an exemplary series of steps that form one type of geo data grooming. Subroutine 1500 begins at block 1501 and proceeds to block 1505 where DGPS data is added (possibly from the augmented DGPS database 470) to improve (augment) the geo data received from the monitoring devices. Next, in block 1510 any partial geo data (e.g., SPS data obtained using less than four satellites) is analyzed to see whether it fills any potential holes in routes determined from the augmented geo data. Next in block 1515, confidence ratings are computed for individual geo data points. Those of ordinary skill in the art and others will appreciate that different confidence levels may be ascribed to geo data points depending on the strength of signals and/or length of time a monitoring device 200 was exposed to a satellite signal. The confidence levels are used to further refine the geo data and intermediate points where geo data may not have been recorded. Next in block 1520 the geo data is further augmented by ascribing geo data locations from known data. For example, if a geo data location is found at the entrance of a tunnel and at the exit from a tunnel over a relatively short period of time, predicted points within a tunnel (or urban canyon) can be ascribed to the monitoring device 200 to establish respondent exposure to a media display located in the tunnel. In block 1525, any anomalous geo data is saved for potential further processing. Finally, in block 1599, subroutine 1500 returns to its calling routine.

An exemplary location matching subroutine 1600 suitable for use by the post processing server 400 is illustrated in FIG. 16 and described next. In order to determine whether a respondent was exposed (or at least had the opportunity to be exposed) to a media display, it is necessary to determine if the respondent was in the vicinity of the media display. Accordingly, location matching subroutine 1600 compares respondent locations determined by geo data to media display locations. Location matching begins at block 1601 and proceeds to looping block 1605 where for all location zones (e.g., zones where someone might be exposed to a media display), are tested for matching. In block 1610 the geo data is examined to detect all routes that cross the location zone at different times from a direction (or directions) of interest. As the respondent may be moving at different speeds, at a given distance and a given speed there would have not been enough time for an exposure at a particular distance. Accordingly, in one embodiment of the invention a respondent has been exposed to a small media display when walking within fifty feet of the display, but not exposed when driving by the media display at 35 mph. This may be determined by examining the geo data and the location of the media display in question Next, redundant zone entries are eliminated (block 1615). The redundant zone entries are only eliminated if they indicate repeated entry and exit from the zone, which would indicate a location respondent who is close to a zone boundary. The redundant entries elimination performed by block 1615 is to add hysteresis to counter redundant zone crossings introduced by a respondent's movement. Then in block 1620, additional information such as the number of zone crossings and the speed of these crossings is saved. At looping block 1625, processing loops back to 1605 unless all location zones have been processed, in which case the location matching subroutine 1600 returns to its calling routine at block 1699.

Not all information gathered by a monitoring device 200 is always going to be useful information. Non-useful information should be removed from the study if it is determined that it was inaccurately obtained. The determination of what information is non-useful is known as tabulation or tab analysis.

An exemplary tab analysis subroutine 1700 is illustrated in FIG. 17. The tab analysis subroutine 1700 begins at block 1701 and proceeds to looping block 1705 where for each monitoring device's data (or at least each study of monitoring if more than one person used the same monitoring device) the following is performed. In decision block 1710, a determination is made whether there were any device failures. This information is included in the stored anomalous data. Device failure may be indicated by an indication that a monitoring device was producing erratic results, or that watchdog timer events were logged. Any data from monitoring devices having a failure indication is removed from the aggregated data sample in block 1725. Next, the aggregated data is expanded to cover the removed data in block 1730. Those of ordinary skill in the art and others will appreciate that the aggregated data may not have to be expanded in all circumstances.

If in decision block 1710 it was determined that there were no device failures, processing continues to decision block 1715 where a determination is made whether an uncooperative person used the device. Those of ordinary skill in the art and others will appreciate that if a respondent takes a monitoring device 200 and simply leaves it on a nightstand during the study period any geo data gathered would not be indicative of the respondent's exposure to publicly viewable media displays (except in the unlikely event that the person did not leave the vicinity of their nightstand for the full study period). Such respondents are designated uncooperative. Other examples will also be apparent to those of ordinary skill in the art and others, such as respondents never turning on a device. Accordingly, if in decision block 1715 it was determined that an uncooperative respondent used the device, processing continues to block 1720 where the uncooperative person's data is saved. Storing this data allows the uncooperative respondent to be included in the results of the study should it later be determined that the respondent actually was cooperative and potentially for other reasons as well. Processing then would continue to block 1725 and proceed as before. If however in decision block 1715 it was determined that a cooperative person (e.g., someone who turned on the device and carried it during a study) used the device, then processing continues to looping block 1735. Processing also proceeds to looping block 1735 after block 1730. At looping block 1735 processing loops back to looping block 1705 unless all devices data have been iterated through, in which case processing continues to block 1799 where subroutine 1700 returns to its calling routine.

As noted above, a number of different rating subroutines may be employed by embodiments of the present invention. Those of ordinary skill in the art and others will appreciate that the geo data that is obtainable from the monitoring devices 200 may have applications other than strictly determining the exposure, reach and frequency of publicly viewable media displays.

Figure 22:
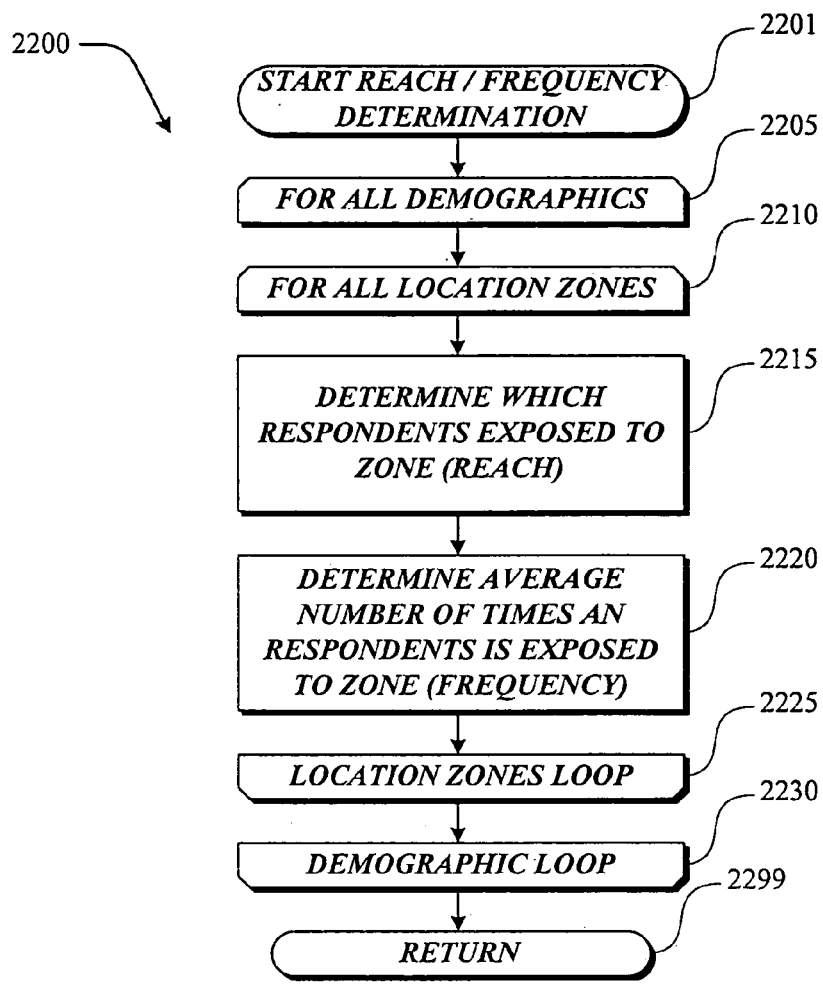
FIG. 22 is an overview flow diagram illustrating a reach and frequency analysis subroutine suitable for use in FIG. 20.

In a first exemplary rating subroutine 1800 publicly viewable media displays are assessed with regard to exposure, reach and frequency. Subroutine 1800 begins at block 1801 and proceeds to reach and frequency processing subroutine 2200. An exemplary reach and frequency processing subroutine 2200 is illustrated in FIG. 22 and described below. Next, processing continues to block 1810 where gross rating points ("GRPs") are also calculated based on the geo data. Next in block 1815 daily effective circulation ratings are determined based on the geo data The ratings are then returned to the calling routine in block 1899.

Figure 19:
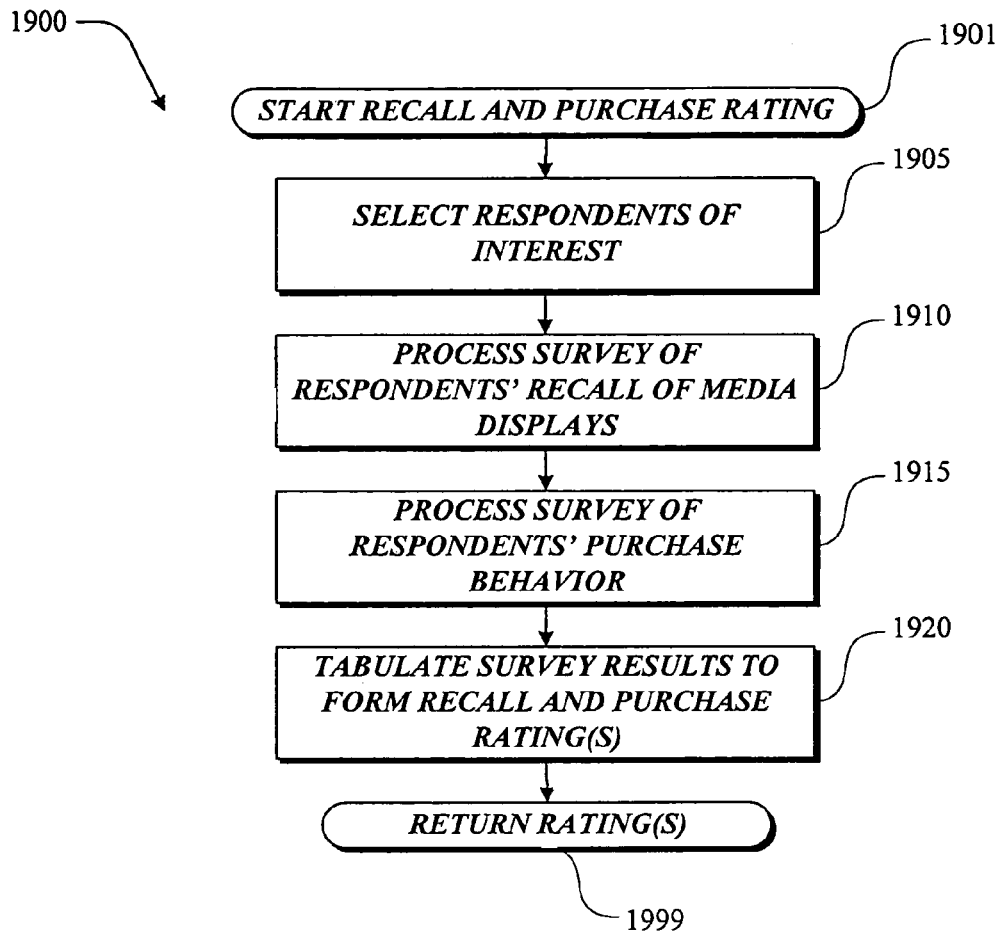
FIG. 19 is an overview flow diagram illustrating a recall and purchasing rating subroutine suitable for use in FIG. 14.

FIG. 19 illustrates an exemplary ratings subroutine 1900 for rating respondent recall and purchases. Subroutine 1900 begins at block 1901 and proceeds to block 1905 where respondents of interest are selected. These respondents of interest may be individuals selected in an arbitrary or random manner, individuals who are part of a particular demographic group or groups, or who have been exposed to particular media displays. Next, in block 1910 a survey of respondents' recall of media displays is processed to determine which media displays the respondents recall. Then, in block 1915 a survey of respondents' purchasing behavior is processed. Next, in block 1920 these process survey results are tabulated to form recall and purchase ratings with regard to matched publicly viewable media displays. Routine 1900 then returns at block 1999 to its calling routine with the recall and purchase ratings.

Figure 20:
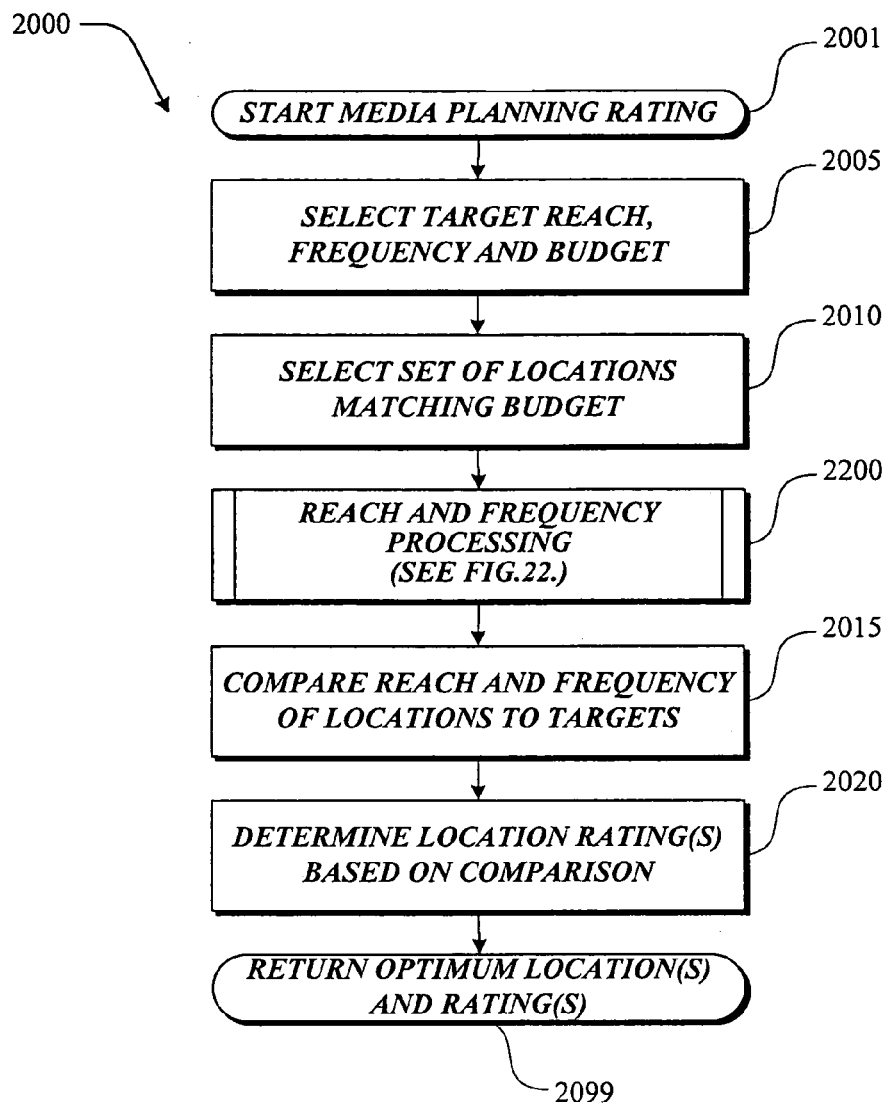
FIG. 20 is an overflow diagram of a media planning rating subroutine suitable for use in FIG. 14.

The previous discussions and ratings described above relate to existing media displays. In contrast, FIG. 20 illustrates an exemplary media display planning subroutine 2000 for rating locations for potential media displays. Media planning subroutine 2000 begins at block 2001 and proceeds to block 2005 where target reach, frequency, and budget information is selected. Next in block 2010 a set of locations for potential media displays is selected. Then a reach and frequency subroutine 2200 that determines the reach and frequency of each potential media display location is executed. An exemplary reach and frequency subroutine is illustrated in FIG. 22 and described below. After reach and frequency for each of the potential media display locations has been determined, in block 2015, the reach and frequency of each location is compared to the target reach and frequency previously selected. Next, in block 2020 the locations' ratings are determined based on how closely they match the target reach and frequency. Media planning rating subroutine 2000 then ends at block 2099 returning the optimum location or locations and ratings of those locations to the calling routine.

Figure 21:
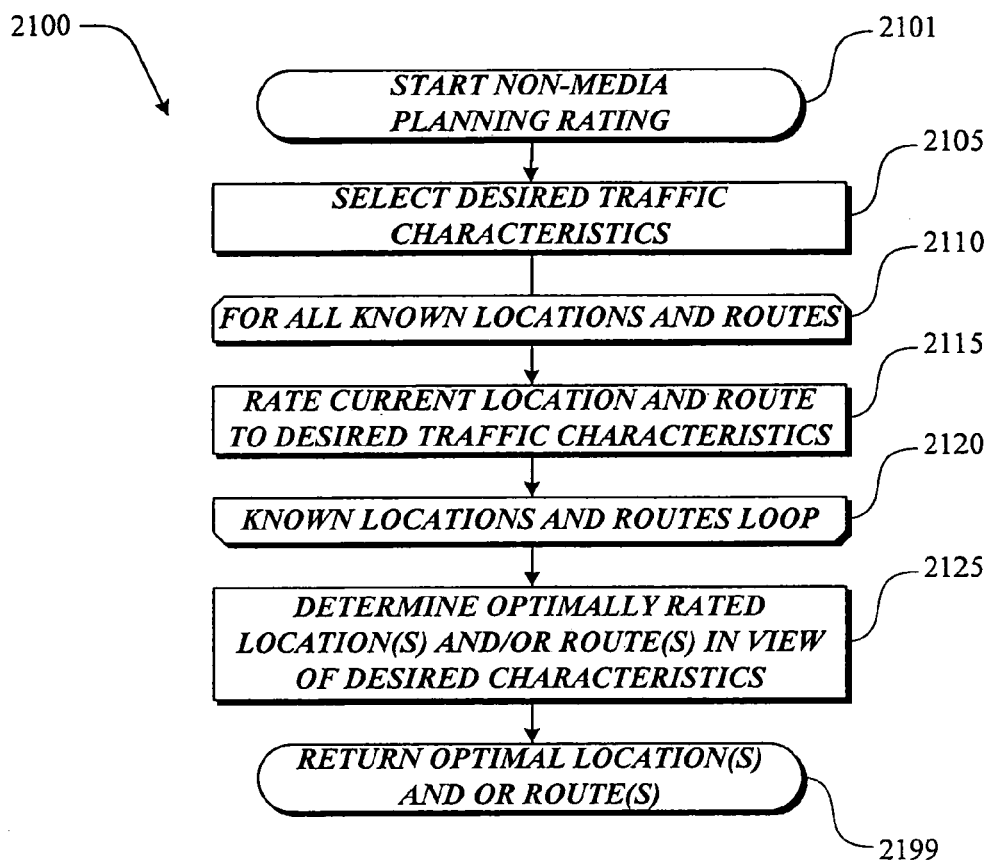
FIG. 21 is an overflow diagram of a non-media planning rating subroutine suitable for use in FIG. 14.

FIG. 21 illustrates an exemplary non-media planning (e.g., road traffic analyses, real estate development, service placements, etc.) subroutine 2100. The illustrated non-media planning subroutine 2100 begins at block 2101 and proceeds to block 2105 where desired traffic (either vehicle or pedestrian) characteristics are selected. Next, in looping block 2110 for all known locations and routes the following is performed. A current location and route is compared to the desired traffic characteristics to form a rating in block 2115. Next in looping block 2120 processing loops back to 2110 unless all known locations and routes have already been iterated through in which case processing proceeds to block 2125. In block 2125, a determination is made of the optimally rated location(s) and/or route(s) in view of the desired traffic characteristics. Non-media planning rating subroutine 2100 then ends at block 2199 returning all optimal location(s) and/or route(s).

FIG. 22 illustrates an exemplary reach and frequency determination subroutine 2200. The illustrated reach/frequency determination subroutine 2200 begins at block 2201 and proceeds to outer looping block 2205 where for all demographics the following is performed. First, at inner looping block 2210 for all locations the following is performed. At block 2215, a determination is made of which respondents were exposed to a zone of interest (reach). Next in block 2220, a determination is made of the average number of times a respondent is exposed to a zone of interest (frequency). Processing then continues to the inner looping block 2225 which returns to block 2210 unless all location zones have been iterated through in which case processing continues to demographic looping block 2230 which loops back to looping block 2205. If all demographics have been looped through, then processing continues to block 2299 where the reach and frequency determination subroutine 2200 returns to its calling routine.

While the term demographics has been used to describe different types of respondents, it will be appreciated by those of ordinary skill in the art and others that sociographic and psychographic categorizations may also be used with the present invention. Accordingly, instead of categorizing respondents based on age, gender, economic level and educational background, it may be possible to categorize respondents in other categories (e.g., early adopter, yuppie, baby boomer, etc.). Thus, demographics should be understood with regard to the present invention to also include sociographic and psychographic categorizations.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for determining the effectiveness of media displays, comprising:
    employing a plurality of monitoring devices for tracking the paths of travel followed by a plurality of respondents, each of said respondents associated with a respective one of said plurality of monitoring devices, each of said plurality of monitoring devices utilizing a satellite positioning system ("SPS") to independently track the movement of the related respondent along the path of travel followed by the respondent, each of said plurality of monitoring devices generating satellite data that represents the path of travel followed by the respondent;
    storing said satellite data;
    collecting the satellite data from each of the monitoring devices; and
    analyzing said collected satellite data to determine if said plurality of respondents have been exposed to media displays by matching geo data based at least in part on said satellite data that represents the paths of travel followed by said plurality of respondents with media display locations to determine the effectiveness of the media displays at the media display locations.

2. The method of claim 1, wherein said monitoring devices also utilize radio frequency positioning to track the paths of travel of said respondents.

3. The method of claim 1, wherein said monitoring devices also utilize an accelerometer to track the paths of travel of said respondents.

4. The method of claim 1, wherein said monitoring devices also utilize a gyroscope to track the paths of travel of said respondents.

5. The method of claim 1, wherein said monitoring devices also utilize a compass to track the paths of travel of said respondents.

6. The method of claim 1, wherein said monitoring devices also utilize an altimeter to track the-paths of travel of said respondents.

7. The method of claim 1, wherein said monitoring devices also utilize a barometer to track the paths of travel of said respondents.

8. The method of claim 1, wherein said plurality of respondents are categorized according to demographic characteristics.

9. The method of claim 1, wherein said monitoring devices are distributed by a common carrier.

10. The method of claim 1, wherein said monitoring devices are distributed by a courier.

11. The method of claim 1, wherein said geo data is stored for a predetermined period of time.

12. The method of claim 1 wherein the satellite data that represents the path of travel followed by a respondent is stored in the monitoring device associated with the respondent.

13. The method of claim 12 wherein the geo data stored in the monitoring devices is collected by downloading the geo data to a computing device.

14. The method of claim 13 wherein the computing device analyzes the geo data to determine if said plurality of respondents have been exposed to media displays by matching said geo data that represents the paths of travel followed by said plurality of respondents with geo data that represents the locations of the media displays to thereby determine the effectiveness of said media displays.

15. The method of claim 1, wherein the satellite data includes partial satellite data.

16. A method for determining the effectiveness of media displays, comprising:
    employing a plurality of monitoring devices for tracking the paths of travel followed by a plurality of respondents, each of said respondents associated with a respective one of said plurality of monitoring devices, each of said plurality of monitoring devices utilizing a satellite positioning system ("SPS") to independently track the movement of the related respondent along the path of travel followed by the respondent, each of said plurality of monitoring devices generating satellite data that represents the path of travel followed by the respondent;
    storing said satellite data;
    downloading the satellite data from each of the monitoring devices for analysis; and
    analyzing said downloaded satellite data to determine if said plurality of respondents have been exposed to media displays by matching geo data based at least in part on said satellite data that represents the paths of travel followed by said plurality of respondents with media display locations to determine the effectiveness of the media displays at the media display locations.

17. The method of claim 16, wherein said monitoring devices also utilize radio frequency positioning to track the paths of travel of said respondents.

18. The method of claim 16, wherein said monitoring devices also utilize an accelerometer to track the paths of travel of said respondents.

19. The method of claim 16, wherein said monitoring devices also utilize a gyroscope to track the paths of travel of said respondents.

20. The method of claim 16, wherein said monitoring devices also utilize a compass to track the paths of travel of said respondents.

21. The method of claim 16, wherein said monitoring devices also utilize an altimeter to track the-paths of travel of said respondents.

22. The method of claim 16, wherein said monitoring devices also utilize a barometer to track the paths of travel of said respondents.

23. The method of claim 16, wherein said plurality of respondents are categorized according to demographic characteristics.

24. The method of claim 16, wherein said monitoring devices are distributed by a common carrier.

25. The method of claim 16, wherein said monitoring devices are distributed by a courier.

26. The method of claim 16, wherein said geo data is stored for a predetermined period of time.

27. The method of claim 16 wherein the satellite data that represents the path of travel followed by a respondent is stored in the monitoring device associated with the respondent.

28. The method of claim 27 wherein the geo data stored in the monitoring devices is collected by downloading the geo data to a computing device.

29. The method of claim 28 wherein the computing device analyzes the geo data to determine if said plurality of respondents have been exposed to media displays by matching said geo data that represents the paths of travel followed by said plurality of respondents with geo data that represents the locations of the media displays to thereby determine the effectiveness of said media displays.

30. The method of claim 16, wherein the satellite data includes partial satellite data.

* * * * *

UNITED STATES PATENT AND TRADEMARK OFFICE
CERTIFICATE OF CORRECTION

PATENT NO. : 7,176,834 B2
APPLICATION NO. : 11/366349
DATED : February 13, 2007
INVENTOR(S) : R.D. Percy et al.

It is certified that error appears in the above-identified patent and that said Letters Patent is hereby corrected as shown below:

| COLUMN | LINE | |
|---|---|---|
| (56) Pg. 2, col. 2 | Refs. Cited (Other Publs., Item 5) | "www.imu.unibe,ch/" should read --www.imu.unibe.ch/-- |
| (73) Pg. 1, col. 1 | Assignee | "Asociates," should read --Associates,-- |
| 2 | 40 | "and or" should read --and/or-- |
| 9 | 55 | "capable of operation a number of" should read --capable of operation in a number of-- |
| 15 | 59 | "a available" should read --an available-- |
| 17 | 43 | "identifies of their location" should read --identifies their locations-- |
| 21 | 22 | "being processed supplemental measures" should read --being processed. Supplemental measures-- |
| 22 | 38 | after "question" insert a period -- . -- |
| 23 | 55 | after "geo data" insert a period -- . -- |
| 25 (Claim 6, | 49 line 2) | "the-paths" should read --the paths-- |

UNITED STATES PATENT AND TRADEMARK OFFICE
CERTIFICATE OF CORRECTION

PATENT NO. : 7,176,834 B2
APPLICATION NO. : 11/366349
DATED : February 13, 2007
INVENTOR(S) : R.D. Percy et al.

It is certified that error appears in the above-identified patent and that said Letters Patent is hereby corrected as shown below:

COLUMN         LINE

26                 50          "the-paths" should read --the paths--
(Claim 21,    line 2)

Signed and Sealed this

Tenth Day of July, 2007

JON W. DUDAS
*Director of the United States Patent and Trademark Office*